US009572118B2

(12) United States Patent
Mitsui et al.

(10) Patent No.: US 9,572,118 B2
(45) Date of Patent: Feb. 14, 2017

(54) COMMUNICATION CONTROL METHOD AND BASE STATION

(71) Applicant: KYOCERA CORPORATION, Kyoto (JP)

(72) Inventors: Katsuhiro Mitsui, Kawasaki (JP); Masato Fujishiro, Yokohama (JP); Kugo Morita, Yokohama (JP); Fangwei Tong, Machida (JP); Chiharu Yamazaki, Tokyo (JP); Yushi Nagasaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/222,673

(22) Filed: Jul. 28, 2016

(65) Prior Publication Data
US 2016/0337990 A1 Nov. 17, 2016

Related U.S. Application Data

(63) Continuation of application No. PCT/JP2015/051989, filed on Jan. 26, 2015.

(30) Foreign Application Priority Data

Jan. 31, 2014 (JP) .................... 2014-017979

(51) Int. Cl.
*H04W 40/00* (2009.01)
*H04W 52/44* (2009.01)
(Continued)

(52) U.S. Cl.
CPC .......... *H04W 52/44* (2013.01); *H04J 11/0069* (2013.01); *H04J 11/0093* (2013.01);
(Continued)

(58) Field of Classification Search
CPC .... H04W 24/02; H04W 24/04; H04W 84/045; H04W 92/20; H04J 11/0093; H04J 11/0069
(Continued)

(56) References Cited

U.S. PATENT DOCUMENTS 8,559,952 B2 * 10/2013 Frenger ................ H04J 11/0093
370/319
8,625,540 B2 * 1/2014 Uemura ................ H04W 24/10
370/332

(Continued)

FOREIGN PATENT DOCUMENTS

| JP | 2012-009945 A | 1/2012 |
|---|---|---|
| JP | 2013-121085 A | 6/2013 |

(Continued)

OTHER PUBLICATIONS

International Search Report issued in PCT/JP2015/051989; mailed Apr. 7, 2015.
(Continued)

*Primary Examiner* — Dominic Rego
(74) *Attorney, Agent, or Firm* — Studebaker & Brackett PC

(57) ABSTRACT

A first base station is configured to be connected with a second base station via an X2 interface. The first base station includes: a controller containing at least one processor and at least one memory, and configured to execute processes of transmitting a message, which includes a first identifier, a change notification, coverage state information, and a second identifier, to the second base station before modifying a coverage of the first cell, the first identifier identifying the first cell, the change notification indicating that the first base station is planned to modify the coverage of the first cell, the coverage state information indicating that a state of the coverage after modification of the coverage, the second (Continued)

identifier identifying a second cell for compensating at least part of the coverage of the first cell; and modifying the coverage of the first cell after transmitting the message.

8 Claims, 18 Drawing Sheets

(51) Int. Cl.
| | |
|---|---|
| H04W 52/02 | (2009.01) |
| H04W 36/00 | (2009.01) |
| H04W 84/04 | (2009.01) |
| H04J 11/00 | (2006.01) |
| H04W 24/04 | (2009.01) |
| H04W 92/20 | (2009.01) |
| H04W 24/02 | (2009.01) |
| H04W 88/08 | (2009.01) |

(52) U.S. Cl.
CPC .......... *H04W 24/02* (2013.01); *H04W 24/04* (2013.01); *H04W 36/0061* (2013.01); *H04W 52/0206* (2013.01); *H04W 84/045* (2013.01); *H04W 92/20* (2013.01); *H04W 88/08* (2013.01)

(58) Field of Classification Search
USPC .............................. 455/435.2, 436, 442–444
See application file for complete search history.

(56) References Cited

U.S. PATENT DOCUMENTS

| | | | | |
|---|---|---|---|---|
| 8,712,430 | B2* | 4/2014 | Tang | H04W 24/02 455/115.1 |
| 8,737,921 | B2* | 5/2014 | Hong | H04W 16/06 455/450 |
| 2009/0047956 | A1* | 2/2009 | Moe | H04J 11/0093 455/436 |
| 2010/0278038 | A1* | 11/2010 | Stahle | H04W 24/04 370/216 |
| 2011/0189992 | A1* | 8/2011 | Bonneville | H04W 48/12 455/434 |
| 2012/0004009 | A1* | 1/2012 | Lindoff | H04W 52/0232 455/522 |
| 2012/0014274 | A1 | 1/2012 | Muraoka et al. | |
| 2013/0194989 | A1* | 8/2013 | Centonza | H04W 52/0206 370/311 |
| 2013/0244643 | A1 | 9/2013 | Yokoyama | |
| 2013/0260768 | A1* | 10/2013 | Guo | H04W 36/08 455/438 |
| 2013/0322390 | A1* | 12/2013 | Xu | H04W 76/02 370/329 |
| 2013/0344880 | A1* | 12/2013 | Tamura | H04W 72/0433 455/450 |
| 2014/0120917 | A1* | 5/2014 | Yoshihara | H04W 36/0033 455/436 |
| 2014/0235218 | A1* | 8/2014 | Hahn | H04W 16/26 455/418 |
| 2014/0248881 | A1* | 9/2014 | Xu | H04W 36/0033 455/436 |

FOREIGN PATENT DOCUMENTS

| | | |
|---|---|---|
| WO | 2010/071186 A1 | 6/2010 |
| WO | 2012/101738 A1 | 8/2012 |

OTHER PUBLICATIONS

Written Opinion issued in PCT/JP2015/051989; mailed Apr. 7, 2015.

3rd Generation Partnership Project; Technical Specification Group Radio Access Network; Evolved Universal Terrestrial Radio Access (E-UTRA); Study on Energy Saving Enhancement for E-UTRAN; 3GPP TR 36.887 V0.2.0; Aug. 2013; pp. 1-15; Release 12; 3GPP Organizational Partners.

Kyocera Corp.; Coverage configuration transition management for ES coverage scenario; 3GPP TSG RAN WG3 Meeting #82; R3-132298; Nov. 11-15, 2013; San Francisco, CA, USA.

JP Office Action dated Nov. 28, 2016 from corresponding JP Appl No. 2015-559926, with concise statement of relevance, 4 pp.

* cited by examiner

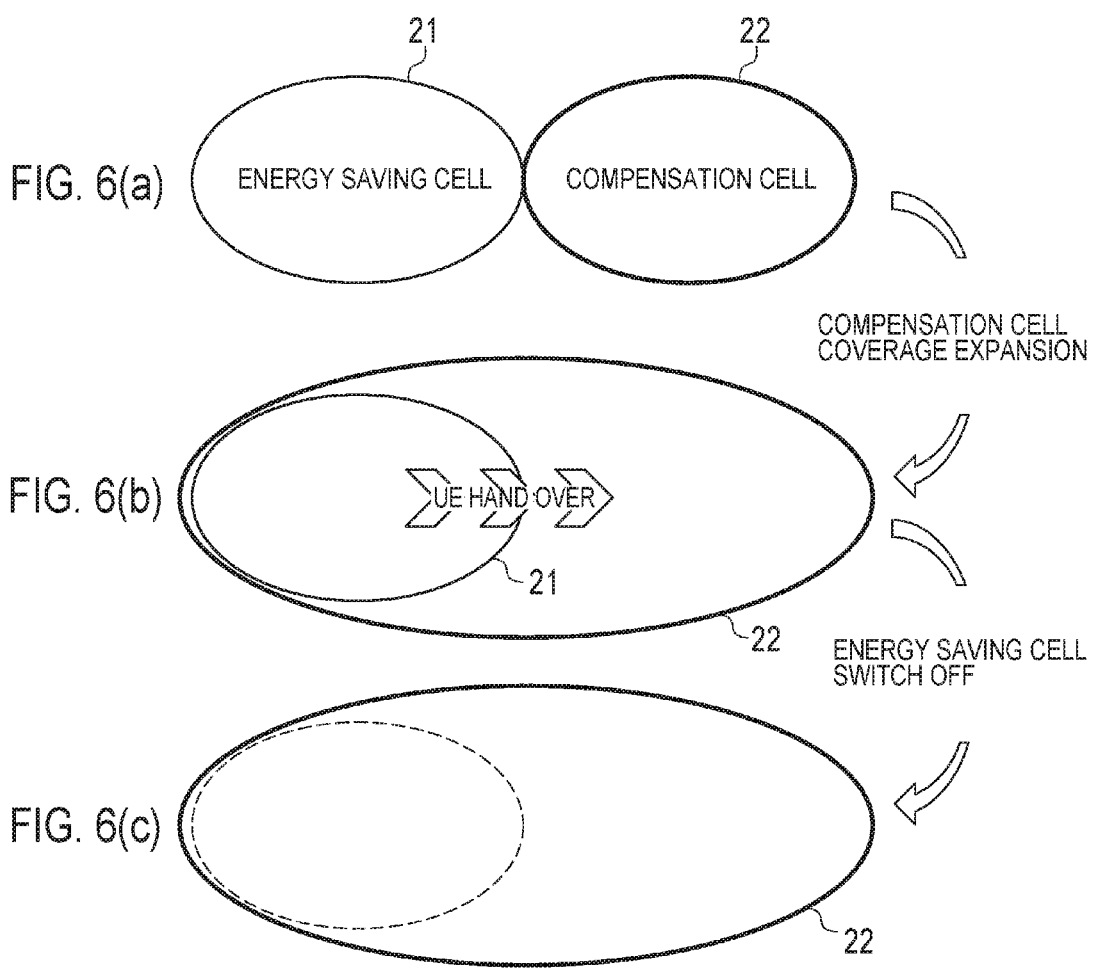

| INTERIOR COVERAGE AREA | AREA 0 | AREA 1 | AREA 2 | AREA 3 |
|---|---|---|---|---|
| NUMBER OF UE | MANY | A FEW | NO UE | MANY |
| TRANSITION SPEED | SLOW | FAST | NO TRANSITION | SLOW |

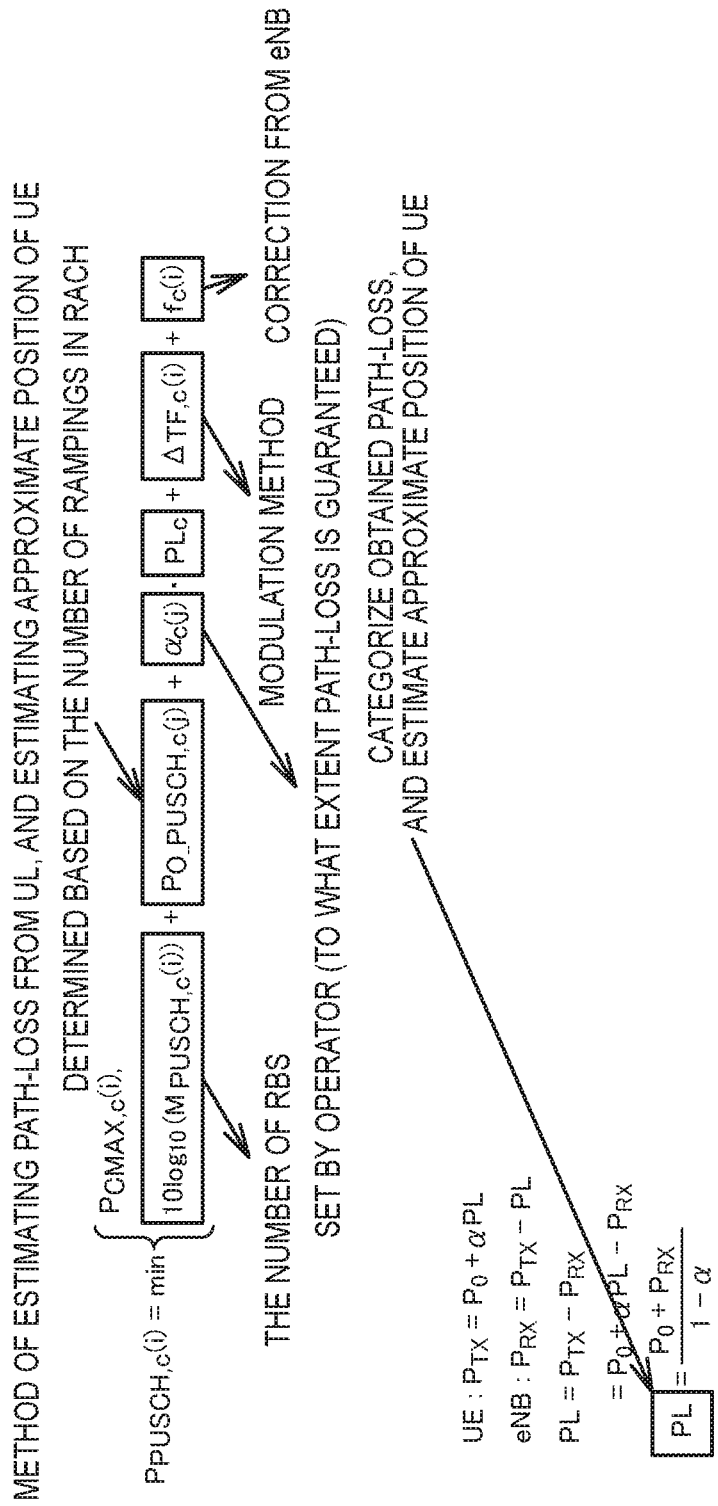

FIG. 19

POWER HEADROOM LEVEL FOR PHR
(INDICATE HEADROOM FROM MAXIMUM TRANSMISSION
POWER THAT CAN BE OUTPUT BY UE)

| PH | POWER HEADROOM LEVEL |
|----|----------------------|
| 0  | POWER HEADROOM_0     |
| 1  | POWER HEADROOM_1     |
| 2  | POWER HEADROOM_2     |
| 3  | POWER HEADROOM_3     |
| ... | ...                 |
| 60 | POWER HEADROOM_60    |
| 61 | POWER HEADROOM_61    |
| 62 | POWER HEADROOM_62    |
| 63 | POWER HEADROOM_63    |

POWER HEADROOM IS TRANSMITTED
TO eNB USING REPORT FROM UE $$PH_{type1,c}(i) = \tilde{P}_{CMAX,c}(i) - \left[ 10\log_{10}(M_{PUSCH,c}(i)) + P_{O\_PUSCH,c}(j) + \alpha_c(j) \cdot PL_c + \Delta_{TF,c}(i) + f_c(i) \right]$$

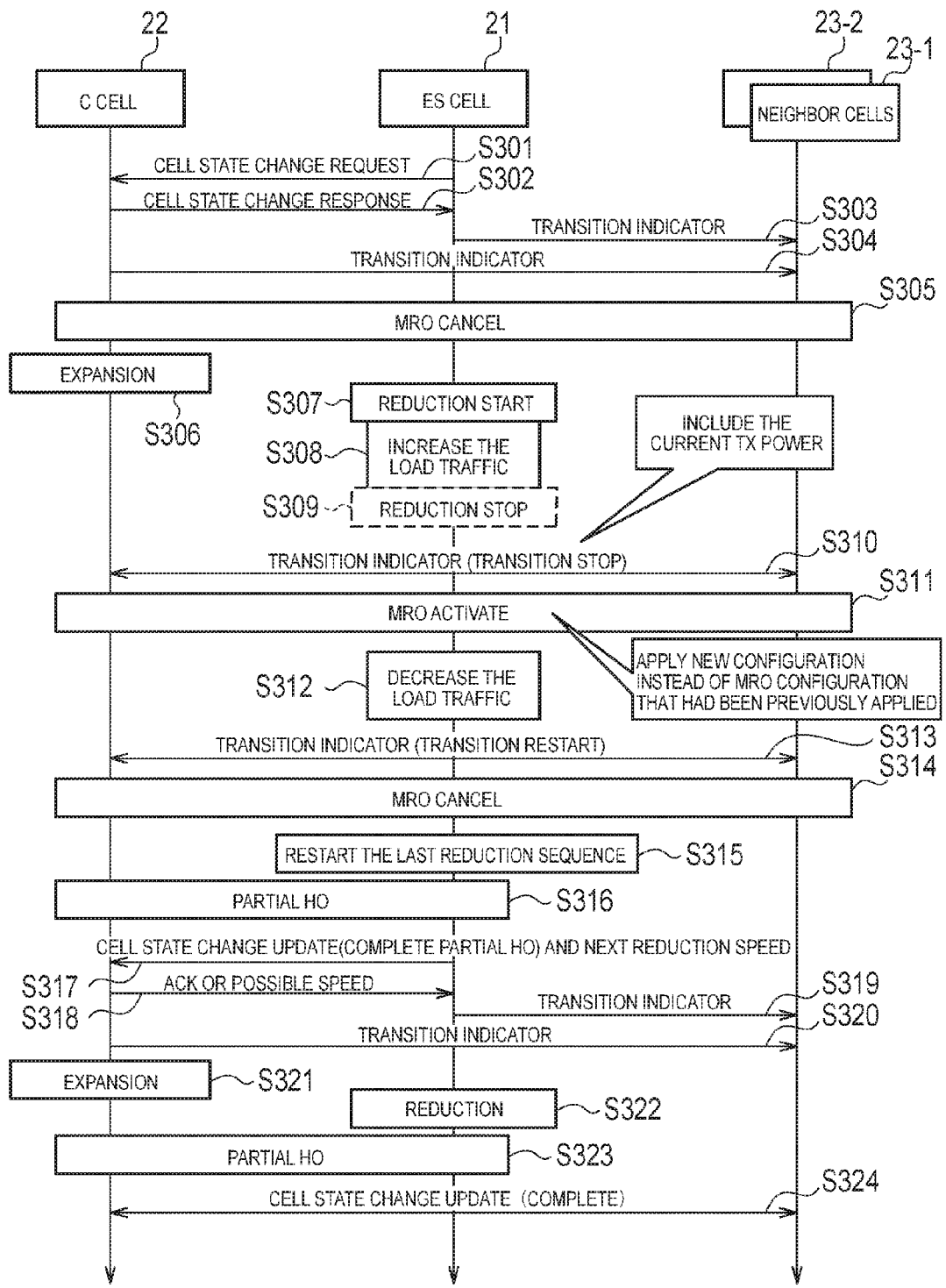

COMMUNICATION CONTROL METHOD AND BASE STATION

TECHNICAL FIELD

The present disclosure relates to a communication control method and a base station that are used in a mobile communication system.

BACKGROUND ART

In the 3rd Generation Partnership Project (3GPP), which is a mobile communication system standardization project, a power saving (energy saving) technology of saving power consumption of a network has been introduced. For example, cells managed by a base station is turned off (deactivated) in the nighttime or the like in which communication traffic is small.

In addition, in the 3GPP, an enhanced energy saving technology is planned to be introduced from the release 12 (for example, refer to Non Patent Literature 1). For example, when one cell (hereinafter, referred to as an "off target cell") is turned off, the transmission power of a neighbor another cell (hereinafter, referred to as a "compensation cell") is raised. As a result, the coverage of the compensation cell can be expanded (coverage expansion), and the coverage of the off target cell can be compensated for (i.e., area compensation).

In this case, for preventing the occurrence of coverage holes, there can be considered a method of stopping the transmission power of the off target cell after raising the transmission power of the compensation cell.

CITATION LIST

Non Patent Literature

Non Patent Literature 1: 3GPP Technical Report "TR 36.887 V0.2.0" August 2013

SUMMARY

Nevertheless, in the above-described method, large interference can occur between the off target cell and the compensation cell in a period in which the coverage of the off target cell and the coverage of the compensation cell are overlapped.

Thus, a preferable method is a method of gradually raising the transmission power of the compensation cell while gradually decreasing the transmission power of the off target cell. In other words, a preferable method is a method of gradually expanding the coverage of the compensation cell while gradually reducing the coverage of the off target cell.

Thus, an object of the present disclosure is to provide a communication control method and a base station that can perform appropriate control in the case of gradually expanding the coverage of the compensation cell while gradually reducing the coverage of the off target cell.

A system according to a first aspect includes: a first base station configured to manage a first cell; and a second base station configured to be connected with the first base station via an X2 interface. The first base station is configured to execute processes of transmitting a message, which includes a first identifier, a change notification, coverage state information, and a second identifier, to the second base station before modifying a coverage of the first cell, the first identifier identifying the first cell, the change notification indicating that the first base station is planned to modify the coverage of the first cell, the coverage state information indicating a state of the coverage of the first cell after modification of the coverage, the second identifier identifying a second cell for compensating at least part of the coverage of the first cell; and modifying the coverage of the first cell after transmitting the message. The second base station is configured to execute processes of receiving the message, determining that the first base station modifies the coverage of the first cell, based on the first identifier, the change notification, and the coverage state information.

A first base station according to a second aspect is configured to be connected with a second base station via an X2 interface. The first base station includes: a controller containing at least one processor and at least one memory, and configured to execute processes of transmitting a message, which includes a first identifier, a change notification, coverage state information, and a second identifier, to the second base station before modifying a coverage of the first cell, the first identifier identifying the first cell, the change notification indicating that the first base station is planned to modify the coverage of the first cell, the coverage state information indicating that a state of the coverage after modification of the coverage, the second identifier identifying a second cell for compensating at least part of the coverage of the first cell; and modifying the coverage of the first cell after transmitting the message.

A second base station according to a third aspect is configured to be connected with a first base station via an X2 interface. The second base station includes: a controller containing at least one processor and at least one memory, and configured to execute processes of receiving a message, which includes a first identifier, a change notification, coverage state information, and a second identifier from the first base station before a coverage of the first cell is modified, the first identifier identifying the first cell, the coverage state information indicating a state of the coverage of the first cell after modification of the coverage, the second identifier identifying a second cell for compensating at least part of the coverage of the first cell; and determining that the first base station modifies the coverage of the first cell, based on the first identifier, the change notification, and the coverage state information.

BRIEF DESCRIPTION OF DRAWINGS

FIGS. 6(a) to 6(c) are diagrams for illustrating an ES technology.

FIG. 18 is a diagram for illustrating the details of step S2101 in FIG. 16, and is a diagram illustrating a case of using transmission and reception power of an uplink signal.

FIG. 19 is a diagram for illustrating the details of step S2101 in FIG. 16, and is a diagram illustrating a case of using a headroom value of uplink transmission power.

FIG. 21 is a sequence diagram illustrating an operation sequence according to the third embodiment.

DESCRIPTION OF EMBODIMENTS

Overview of Embodiments

Figure 1:
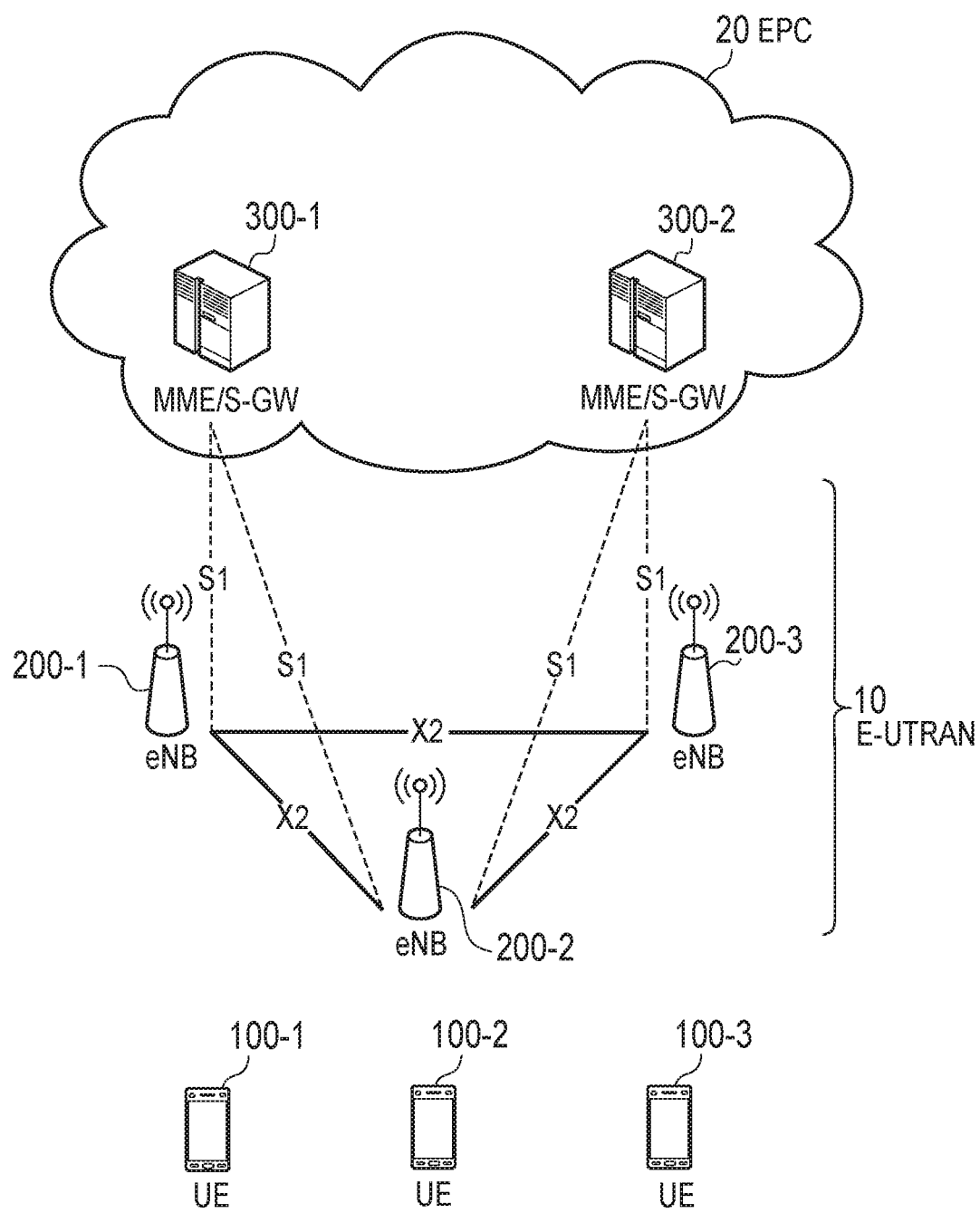
FIG. 1 is a configuration diagram of a Long Term Evolution (LTE) system according to first to third embodiments.

A communication control method according to a first embodiment is a method for performing a cell expansion operation of gradually expanding a coverage of a compensation cell while gradually reducing a coverage of an off target cell. The communication control method includes the steps of: transmitting, by the off target cell, a coverage reduction notification indicating that the coverage of the off target cell is gradually reduced, at least to a neighbor cell other than the compensation cell; and transmitting, by the compensation cell, a coverage expansion notification indicating that the coverage of the compensation cell is gradually expanded, at least to a neighbor cell other than the off target cell.

In the first embodiment, the coverage reduction notification includes information indicating a required time until coverage reduction of the off target cell is completed. The coverage expansion notification includes information indicating a required time until coverage expansion of the compensation cell is completed.

In the first embodiment, the coverage reduction notification includes information indicating a coverage reduction speed of the off target cell. The coverage expansion notification includes information indicating a coverage expansion speed of the compensation cell.

In the first embodiment, the communication control method further includes the steps of: stopping, by the neighbor cell that has received the coverage reduction notification, application of a mobility-related parameter optimized for the off target cell; and stopping, by the neighbor cell that has received the coverage expansion notification, application of a mobility-related parameter optimized for the compensation cell.

In the first embodiment, the communication control method further includes the steps of, by the neighbor cell that has received the coverage reduction notification or the coverage expansion notification: receiving a report on a radio link failure from a user terminal; and transmitting a radio link failure notification corresponding to the report, to another neighbor cell. The step of transmitting the radio link failure notification includes a step of adding, to the radio link failure notification, information related to whether the radio link failure has occurred within a period of the cell expansion operation, based on the coverage reduction notification or the coverage expansion notification, and time information included in the report.

In the first embodiment, the communication control method further includes a step of suppressing, by the neighbor cell that has received the coverage reduction notification, handover of a user terminal from the neighbor cell itself to the off target cell.

In the first embodiment, the step of suppressing the handover includes the steps of: in a case in which a remaining time until the off target cell completes coverage reduction is equal to or larger than a threshold value, permitting the handover from the neighbor cell itself to the off target cell; in a case in which the remaining time is less than the threshold value, performing the handover to the compensation cell, instead of the handover to the off target cell; and in a case in which the remaining time is less than the threshold value, controlling a user terminal connected to the neighbor cell itself, to exclude the off target cell from a measurement target.

In the first embodiment, the communication control method further includes the steps of: transmitting, by the off target cell, the coverage expansion notification to a cell, which is a neighbor cell of the off target cell, and is not a neighbor cell of the compensation cell, on behalf of the compensation cell; and transmitting, by the compensation cell, the coverage reduction notification to a cell, which is a neighbor cell of the compensation cell, and is not a neighbor cell of the off target cell, on behalf of the off target cell.

A base station according to the first embodiment is used in a system for performing a cell expansion operation of gradually expanding a coverage of a compensation cell while gradually reducing a coverage of an off target cell. In a case in which the base station itself manages the off target cell, the base station is configured to transmit, at least to a neighbor cell other than the compensation cell, a coverage reduction notification indicating that the coverage of the off target cell is gradually reduced.

In the first embodiment, in a case in which the base station itself manages the compensation cell, the base station is configured to transmit, at least to a neighbor cell other than the off target cell, a coverage expansion notification indicating that the coverage of the compensation cell is gradually expanded.

A communication control method according to a second embodiment is a method for performing a cell expansion operation of gradually expanding a coverage of a compensation cell while gradually reducing a coverage of an off target cell. The communication control method includes the steps of: determining, by the off target cell, a coverage reduction speed of the off target cell based on the number of connected user terminals indicating the number of user terminals connected to the off target cell; and transmitting speed information indicating the determined coverage reduction speed, from the off target cell to the compensation cell.

In the second embodiment, the step of determining the coverage reduction speed includes the steps of: dividing the coverage of the off target cell into a plurality of areas having different distance zones from a coverage center; obtaining the number of connected user terminals of each of the plurality of areas; and determining, for each target area in the plurality of areas, a coverage reduction speed of the target are based on the number of connected user terminals of the target area.

In the second embodiment, the communication control method further includes a step of transmitting, by the compensation cell that has received the speed information, response information indicating whether to permit the speed indicated by the received speed information, to the off target cell.

In the second embodiment, the step of obtaining the number of connected user terminals includes a step of estimating a distance from the coverage center for each user terminal connected to the off target cell. In the step of estimating the distance, the distance is estimated based on at least one of an adjusted value of an uplink transmission timing, transmission and reception power of an uplink signal, and a headroom value of uplink transmission power.

A base station according to a second embodiment is a base station for managing an off target cell in a system for performing a cell expansion operation of gradually expanding a coverage of a compensation cell while gradually reducing a coverage of the off target cell. The base station is configured to transmit speed information indicating a coverage reduction speed of the off target cell, to the compensation cell. The coverage reduction speed is based on the number of connected user terminals indicating the number of user terminals connected to the off target cell.

In the second embodiment, the base station is further configured to determine a coverage reduction speed of the off target based on the number of connected user terminals indicating the number of user terminals connected to the off target cell, and transmit speed information indicating the determined coverage reduction speed, to the compensation cell.

A communication control method according to a third embodiment is a method for performing a cell expansion operation of gradually expanding a coverage of a compensation cell while gradually reducing a coverage of an off target cell. The communication control method includes the steps of: transmitting, by the off target cell, in a case of stopping coverage reduction of the off target cell, a coverage reduction stop notification to neighbor cells including the compensation cell; and transmitting, by the compensation cell, in a case of stopping coverage expansion of the compensation cell, a coverage expansion stop notification to neighbor cells including the off target cell.

In the third embodiment, the coverage reduction stop notification includes information indicating a period for which coverage reduction of the off target cell is to be stopped. The coverage expansion stop notification includes information indicating a period for which coverage expansion of the compensation cell is to be stopped.

In the third embodiment, the coverage reduction stop notification includes information indicating transmission power of the off target cell that is set when coverage reduction of the off target cell is stopped. The coverage expansion stop notification includes information indicating transmission power of the compensation cell that is set when coverage expansion of the compensation cell is stopped.

In the third embodiment, the communication control method further includes the steps of: transmitting, by the off target cell, in a case of restarting coverage reduction of the off target cell, a coverage reduction restart notification to neighbor cells including the compensation cell; and transmitting, by the compensation cell, in a case of restarting coverage expansion of the compensation cell, a coverage expansion restart notification to neighbor cells including the off target cell.

A base station according to a third embodiment is used in a system for performing a cell expansion operation of gradually expanding a coverage of a compensation cell while gradually reducing a coverage of an off target cell. In a case in which the base station itself manages the off target cell, and coverage reduction of the off target cell is stopped, the base station is configured to transmit a coverage reduction stop notification to neighbor cells including the compensation cell.

In the third embodiment, in a case in which the base station itself manages the compensation cell, and coverage expansion of the compensation cell is stopped, the base station is further configured to transmit a coverage expansion stop notification to neighbor cells including the off target cell.

First Embodiment

An embodiment in a case in which the present disclosure is applied to a Long Term Evolution (LTE) system will be described below.

(System Configuration)

FIG. 1 is a configuration diagram of the LTE system according to the first embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes an eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes an MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
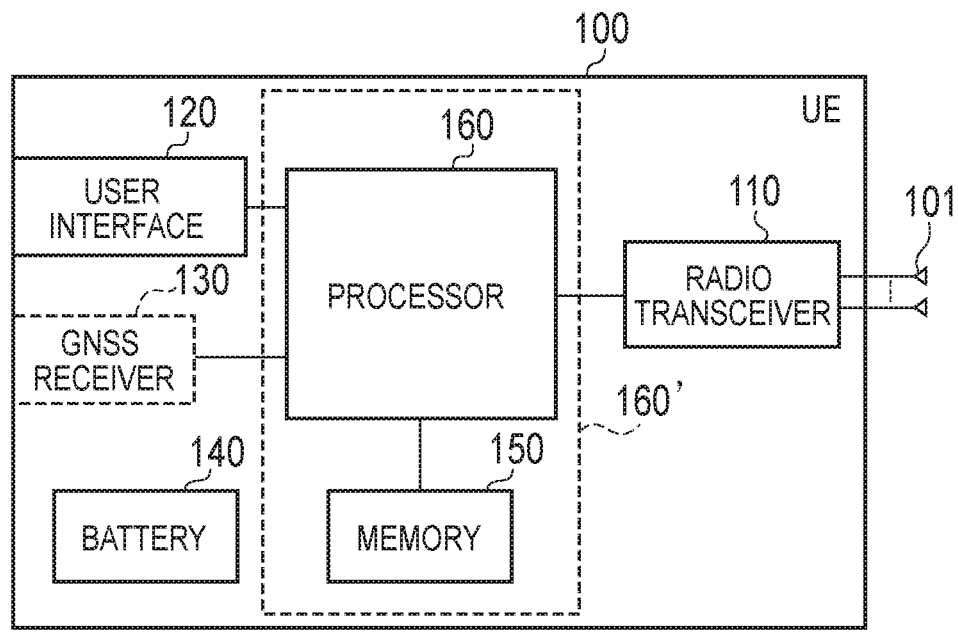
FIG. 2 is a block diagram of a user equipment (UE) according to the first to third embodiments.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a control unit. The UE 100 may not necessarily include the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various types of processes and various communication protocols described later.

Figure 3:
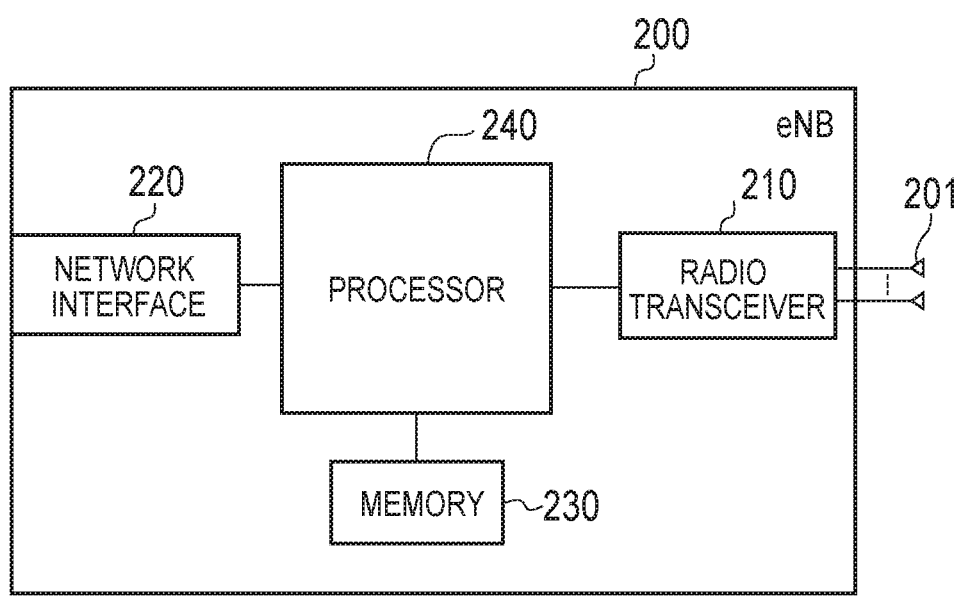
FIG. 3 is a block diagram of an evolved Node-B (eNB) according to the first to third embodiments.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a control unit. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the Si interface. The network interface 220 is used in communication performed on the X2 interface and communication performed on the Si interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various communication protocols described later.

Figure 4:
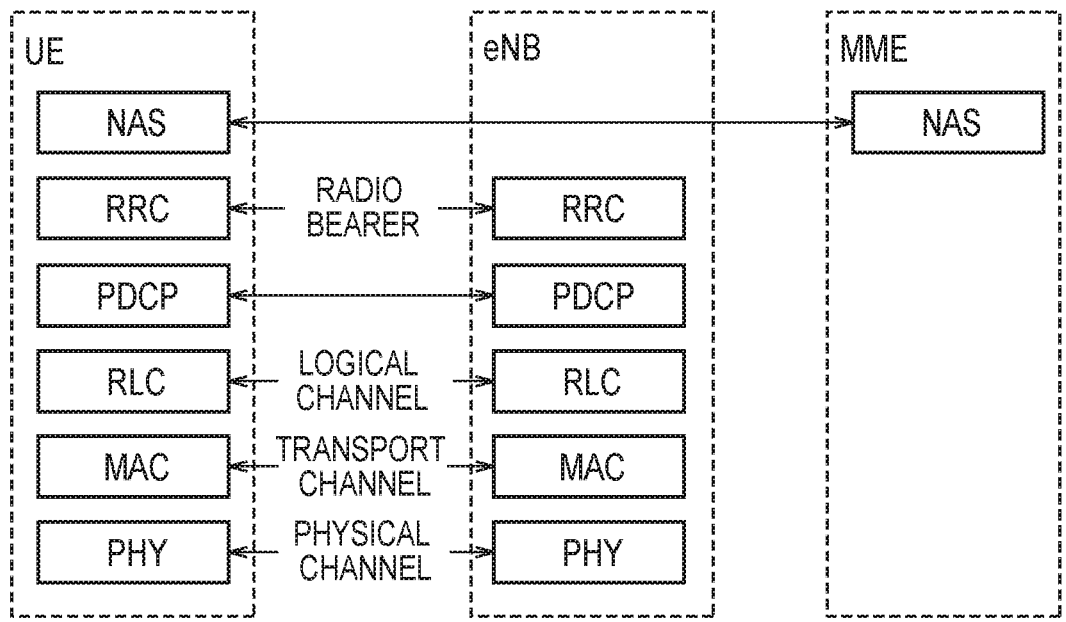
FIG. 4 is a protocol stack diagram of a radio interface according to the first to third embodiments.

FIG. 4 is a protocol stack diagram of a radio interface in the LTE system. As shown in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure during the establishment of an RRC connection, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls the logical channel, the transport channel, and the physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
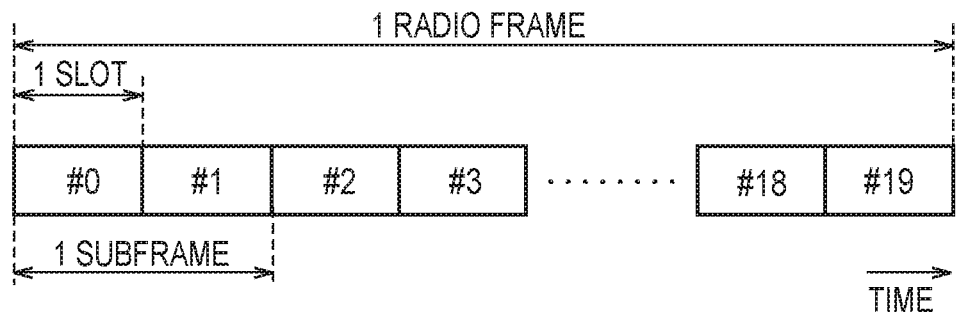
FIG. 5 is a configuration diagram of a radio frame used in the LTE system according to the first to third embodiments.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting a control signal. The other portion in each subframe is a region available as a physical uplink shared channel (PUSCH) for mainly transmitting user data.

(Overview of ES)

An enhanced energy saving (ES) technology (Energy Saving Enhancement) is introduced into the LTE system according to the first embodiment.

In the enhanced ES technology, the combination of an off target cell and a compensation cell is set. The target cell is to be turned off for saving power, and the compensation cell compensates for the coverage of the off target cell if the off target cell is turned off. Hereinafter, the off target cell will be referred to as an "Energy Saving Cell (ES cell)", and the compensation cell will be referred to as a "Compensation Cell (C cell)".

FIGS. 6(a) to 6(c) are diagrams for illustrating the enhanced ES technology.

As illustrated in FIG. 6(a), a neighbor cell of an ES cell 21 is set as a C cell 22. In the first embodiment, the assumption is made on a case in which the ES cell 21 and the C cell 22 belong to different eNBs 200. Nevertheless, the ES cell 21 and the C cell 22 may belong to the same eNB 200.

Next, as illustrated in FIG. 6(b), the C cell 22 raises the transmission power to a set value. The coverage of the C cell 22 thereby expands in such a manner as to cover the coverage of the ES cell 21. In addition, the ES cell 21 hands over a UE 100 connected to the own cell, to the C cell 22. The C cell 22 may perform directional transmission oriented toward the ES cell 21.

Next, as illustrated in FIG. 6(c), after the completion of the handover, the ES cell 21 stops the transmission power of the own cell, and turns the own cell off.

In this manner, in the enhanced ES technology, power saving of the ES cell 21 can be achieved while preventing the occurrence of coverage holes. Nevertheless, in such a method, large interference can occur between the ES cell 21 and the C cell 22 in a period in which the coverage of the ES cell 21 and the coverage of the C cell 22 are overlapped.

Figure 7A:
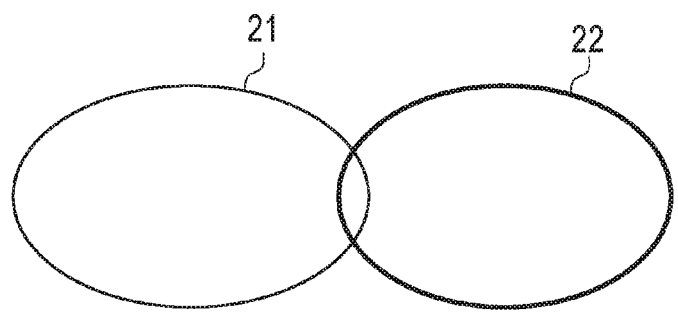
FIGS. 7(a) to 7(c) are diagrams for illustrating a problem of interference that occurs in the ES technology.
Figure 7B:
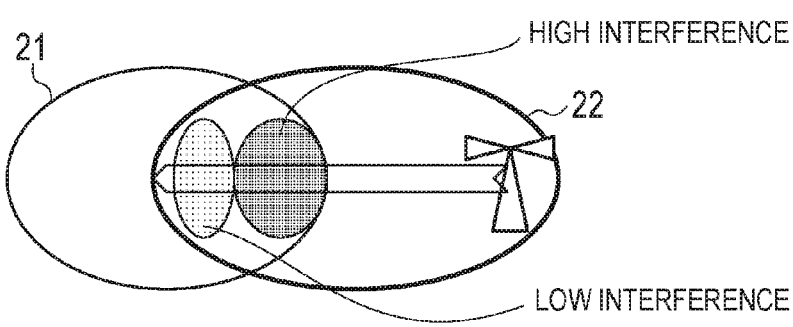
Figure 7C:
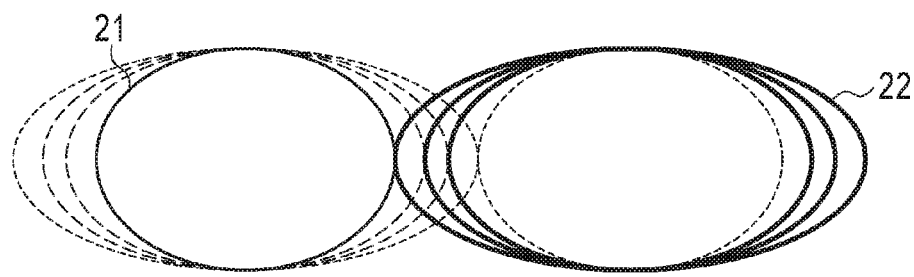

FIGS. 7(a) to 7(c) are diagrams for illustrating a problem of interference that occurs in the enhanced ES technology.

As illustrated in FIG. 7(a), the neighbor cell of the ES cell 21 is set as the C cell 22. Here, the assumption is made on a case in which the same frequency is used in the ES cell 21 and the C cell 22.

Next, as illustrated in FIG. 7(b), the C cell 22 raises the transmission power. The C cell 22 may perform directional transmission oriented toward the ES cell 21. At this time, part of the coverage of the C cell 22 overlaps with the coverage of the ES cell 21. High-level interference accordingly occurs especially at a coverage end portion (cell edge) of the ES cell 21, and communication between the ES cell 21 and the UE 100 that connects to the ES cell 21 at the cell edge of the ES cell 21 may be disrupted.

For avoiding such an interference problem, in the first embodiment, as illustrated in FIG. 7(c), the transmission power of the C cell 22 is gradually raised while the transmission power of the ES cell 21 is gradually decreased. In other words, a gradual cell expansion operation of gradually expanding the coverage of the C cell 22 while gradually reducing the coverage of the ES cell 21 is performed. This can make it difficult for the coverage of the C cell 22 to overlap with the coverage of the ES cell 21. Thus, the occurrence of interference can be suppressed. In addition, even if the coverages overlap, the occurrence of high-level interference can be suppressed.

In addition, the gradual cell expansion operation will be hereinafter referred to as "ES transition". In addition, a state in which the cell expansion operation is completed and the ES cell 21 is switched off will be referred to as an "ES state".

(Overview of MRO)

In addition, a Mobility Robustness Optimization (MRO) technology is introduced into the LTE system according to the first embodiment.

The MRO is one of Self Organizing Network (SON) technologies by which a network autonomously adjusts various parameter settings. In the MRO, a network collects information about a handover failure, and optimizes a mobility-related parameter for controlling handover, for reducing a failure rate of the handover of the UE 100.

Examples of the causes of a handover failure include "Too Early HO", "Too Late HO", and the like. Too Early HO causes a radio link failure (RLF) between a target cell immediately after the handover or during the execution of the handover because the handover is started too early. Too Late HO causes an RLF between a source cell before the handover is started or during the execution of the handover because the handover is started too late.

The network can recognize a handover failure based on an RLF report (RLF Report) from the UE 100. In addition, if a cell 1 (eNB) that has received the RLF report is different from a cell 2 (eNB) in which an RLF has occurred, the cell 1 transmits an RLF notification (RLF Indication) including the RLF report, to the cell 2.

The network identifies the cause of the handover failure based on the RLF report, the RLF notification, and the like, and adjusts a mobility-related parameter in such a manner that an RLF does not occur. The mobility-related parameter is, for example, an offset value defined between a pair of cells. The offset value is added to a reception level measured in the UE 100.

Here, the assumption is made on a case in which Too Early HO frequently occurs during the handover from a serving cell of the UE 100 to another cell. In this case, an offset value is adjusted through the MRO in such a manner that the reception level of the other cell becomes lower than the reception level of the serving cell. This can delay the handover to the other cell. The handover can be therefore triggered at an appropriate timing.

As described in detail later, in the first embodiment, if a neighbor cell performs ES transition (coverage reduction/coverage expansion), each cell (each eNB) stops the application of a mobility-related parameter optimized for the neighbor cell in a normal time. This is because a mobility-related parameter optimized in the normal time is inappropriate as the status of the coverage in an ES transition state and the ES state differs from that in the normal time.

In addition, it is preferable that each cell (each eNB) separately manages a mobility-related parameter for the normal time, and a mobility-related parameter for the ES transition state/ES state. In this case, not only the mobility-related parameter for the normal time is optimized through the MRO, but also the mobility-related parameter for the ES transition state/ES state may be optimized through the MRO.

Furthermore, each cell (each eNB) may separately manage and optimize a mobility-related parameter for the ES transition state, and a mobility-related parameter for the ES state.

(Operation Sequence)

Figure 8:
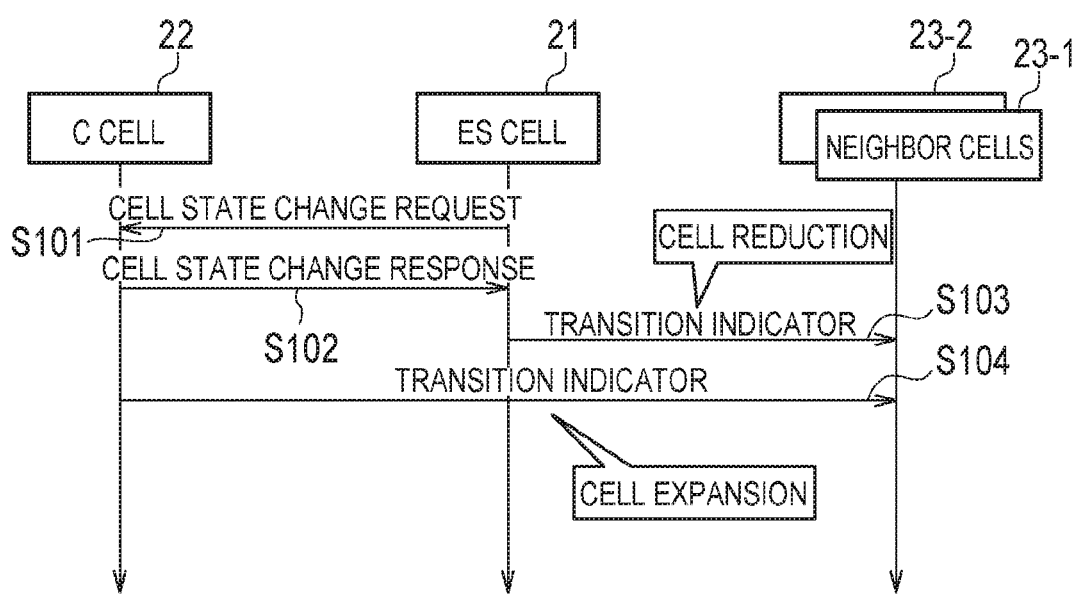
FIG. 8 is a sequence diagram illustrating an operation sequence according to the first embodiment.

FIG. 8 is a sequence diagram illustrating an operation sequence according to the first embodiment. In FIG. 8, each of neighbor cells 23-1 and 23-2 is a neighbor cell of at least either one of the ES cell 21 and the C cell 22. Specifically, each of the Neighbor Cells 23-1 and 23-2 is a cell in a relationship of performing the MRO with at least either one of the ES cell 21 and the C cell 22, and does not have to be in a relationship of being adjacent thereto. Here, the assumption is made on a case in which the ES cell 21, the C cell 22, and the neighbor cells 23-1 and 23-2 belong to their respective different eNBs 200. In this case, a message mutually transmitted and received between the ES cell 21, the C cell 22, and the neighbor cells 23 is transmitted via a backhaul (mainly, the X2 interface).

As illustrated in FIG. 8, in step S101, the ES cell 21 determines to perform ES transition, and transmits, to the C cell 22, a cell state change request (Cell State Change Request) for requesting the change of the own cell to an off state.

In step S102, the C cell 22 that has received the cell state change request transmits, to the ES cell 21, a cell state change response (Cell State Change Response), which is a positive response to the received cell state change request.

In step S103, the ES cell 21 that has received the cell state change response transmits a coverage reduction notification (Transition Indicator) indicating that the coverage of the own cell is gradually reduced, to the neighbor cells 23 other than the C cell 22. The coverage reduction notification (Transition Indicator) is for notifying the state of the ES transition to the neighbor cells 23. The ES cell 21 starts coverage reduction. In addition, the ES cell 21 may be configured to receive a response to the coverage reduction notification, and to start the coverage reduction when the received response is a positive response. In addition, the Transition Indicator may be transmitted before the ES transition, after the ES transition, when the ES is stopped, a coverage reduction speed is changed, or the like.

In step S104, the C cell 22 that has transmitted the cell state change response transmits a coverage expansion notification (Transition Indicator) indicating that the coverage of the own cell is gradually expanded, to the neighbor cells 23 other than the ES cell 21. The coverage expansion notification (Transition Indicator) is for notifying the state of the ES transition to the neighbor cells 23. The C cell 22 that has transmitted the coverage expansion notification starts coverage expansion. In addition, the C cell 22 may be configured to receive a response to the coverage expansion notification, and to start the coverage expansion when the received response is a positive response. In addition, the Transition Indicator may be transmitted before the ES transition, after the ES transition, when the ES is stopped, a coverage reduction speed is changed, or the like.

Based on the coverage reduction notification and/or the coverage expansion notification, the neighbor cells 23 can recognize that the ES cell 21 and the C cell 22 are performing the ES transition. Thus, appropriate control can be performed. In the first embodiment, the neighbor cell 23 that has received the coverage reduction notification and/or the coverage expansion notification performs MRO control and handover control, which will be described later.

(Message Structure)

Table 1 illustrates a message structure of the Transition Indicator. In the first embodiment, the Transition Indicator is used as the coverage reduction notification and the coverage expansion notification.

TABLE 1

| Cell ID | | IE | Indicated Contents |
|---|---|---|---|
| Transition Indicator | ECGI/PCI | Coverage State | Reduction Expansion State1 State2 |

TABLE 1-continued

| Cell ID | IE | Indicated Contents |
|---|---|---|
| | Transition Speed | Speed High Middle Low No Transition |
| | Un receive Indicator | 0 or 1 |
| | Transition Stop | Cause Traffic increase Other problem |
| | Current Transmission Power | dB |
| | Stop Period | Second |
| Transition Restart | | 0 or 1 |
| Transition Time | | Second |

As illustrated in Table 1, the Transition Indicator includes a cell identifier (Cell ID) of a transmission source cell. In addition, the Transition Indicator can include at least one of the following information elements (IEs).

State information (Coverage State) is an information element indicating the state of coverage. Examples of state information include a state in which reduction is being performed (Reduction), a state in which expansion is being performed, a state before reduction/expansion is performed (State1), and a state after reduction/expansion is performed (State2). The state information (Coverage State) is used mainly for the neighbor cells 23 recognizing the coverage state of the ES cell 21 or the C cell 22. In addition, if there are static states other than the State1 and the State2, various states may be defined by the state information.

In the first embodiment, the coverage reduction notification is a Transition Indicator including state information indicating the state in which reduction is being performed (Reduction). In addition, the coverage expansion notification is a Transition Indicator including state information indicating the state in which expansion is being performed (Expansion).

Speed information (Transition Speed) is an information element indicating the speed of coverage reduction/expansion. Examples of speed information include a value of a speed (Speed), high speed (High), middle speed (Middle), low speed (Low), and no transition (No Transition). The speed of coverage reduction/expansion will be described in the second embodiment.

Unreceived information (Un receive Indicator) is an information element indicating whether a cell state change completion notification has been received. The unreceived information is used for prompting the ES cell 21 or the C cell 22 to transmit a cell state change completion notification, if a cell state change completion notification has not been received from the ES cell 21 or the C cell 22 at the time when ES transition should have been completed.

Stop information (Transition Stop) is an information element related to the stop of ES transition. Examples of stop information include the cause of stop (Cause), current transmission power, and a stop period. The stop of ES transition will be described in the third embodiment.

Restart information (Transition Restart) is an information element indicating that stopped ES transition has restarted.

Required time information (Transition Time) is an information element indicating a required time of ES transition.

(MRO Control)

Figure 9:
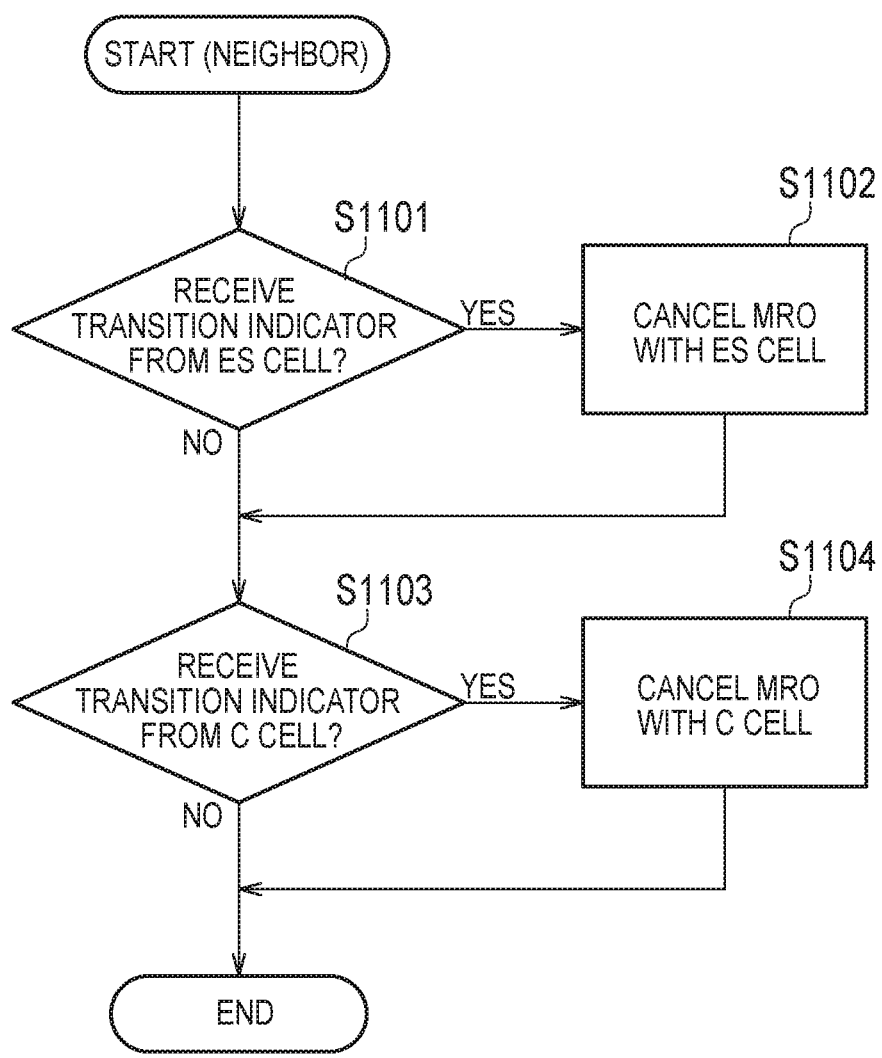
FIG. 9 is a flowchart illustrating an MRO cancel operation according to the first embodiment.

FIG. 9 is a flowchart illustrating an operation of cancelling the MRO in the neighbor cell 23.

As illustrated in FIG. 9, in step S1101, the neighbor cell 23 determines whether a coverage reduction notification (Transition Indicator) has been received from the ES cell 21. If a coverage reduction notification has been received (step S1101; YES), in step S1102, the neighbor cell 23 cancels the MRO with the ES cell 21. More specifically, the neighbor cell 23 stops the application of a mobility-related parameter optimized for the ES cell 21 (mobility-related parameter for the normal time).

In step S1103, the neighbor cell 23 determines whether a coverage expansion notification (Transition Indicator) has been received from the C cell 22. If a coverage expansion notification has been received from the C cell 22 (step S1103; YES), in step S1104, the neighbor cell 23 cancels the MRO with the C cell 22. More specifically, the neighbor cell 23 stops the application of a mobility-related parameter optimized for the C cell 22 (mobility-related parameter for the normal time).

Figure 10:
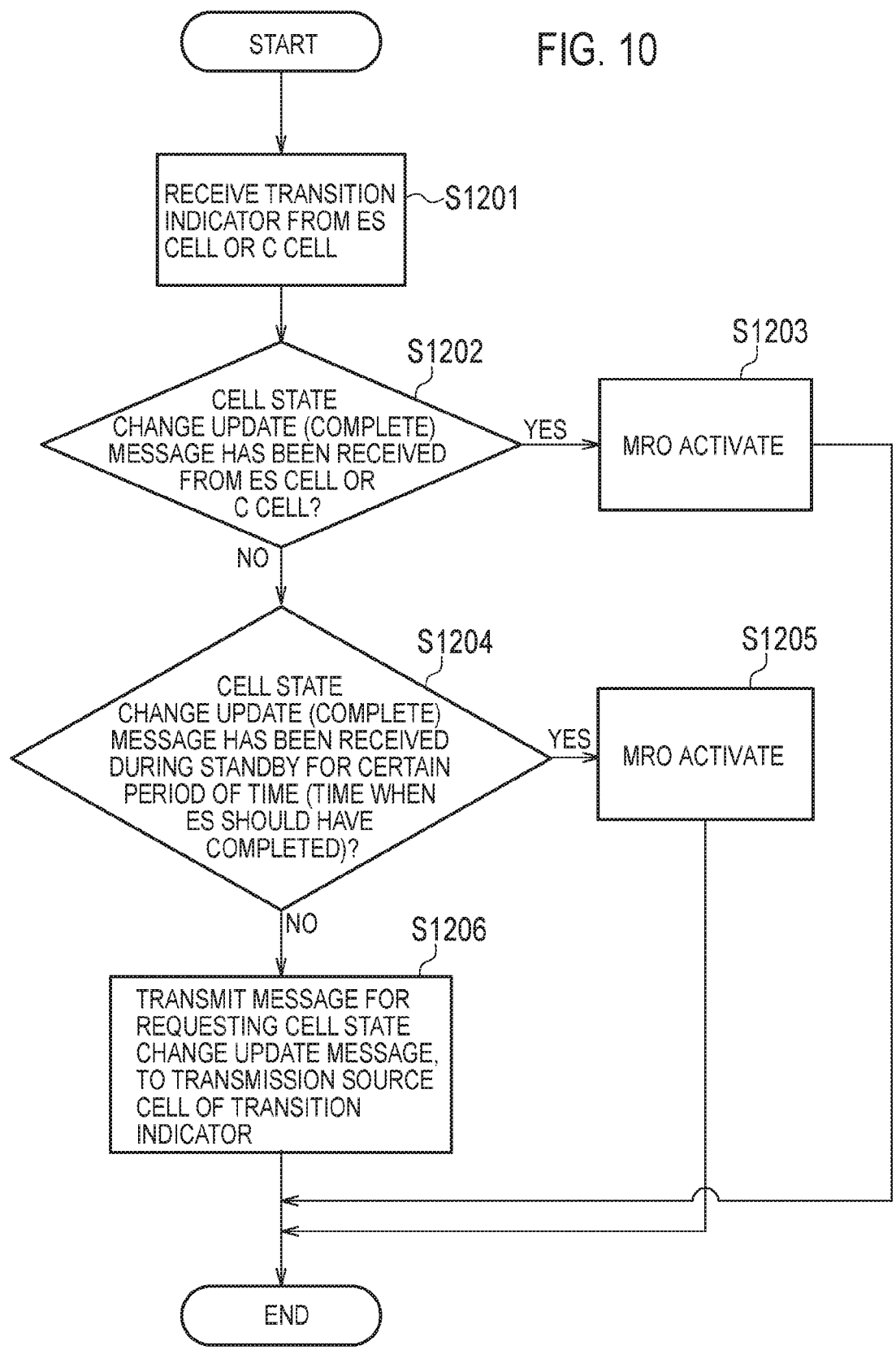
FIG. 10 is a flowchart illustrating an MRO restart operation according to the first embodiment.

FIG. 10 is a flowchart illustrating an operation of restarting (activating) the MRO in the neighbor cell 23.

As illustrated in FIG. 10, in step S1201, the neighbor cell 23 receives the coverage reduction notification and/or the coverage expansion notification (Transition Indicator), and performs the above-described MRO cancel operation.

In step S1202, the neighbor cell 23 determines whether a cell state change completion notification (Cell State Change Update (Complete)) indicating the completion of ES transition has been received from the ES cell 21 or the C cell 22. If the cell state change completion notification has been received from the ES cell 21 or the C cell 22 (step S1202; YES), in step S1203, the neighbor cell 23 restarts (activates) the MRO with the ES cell 21 and/or the C cell 22. More specifically, the neighbor cell 23 switches from the mobility-related parameter for the normal time to the mobility-related parameter for the ES state, and performs the MRO using the mobility-related parameter for the ES state.

If the cell state change completion notification has not been received from the ES cell 21 or the C cell 22 (step S1202; NO), in step S1204, the neighbor cell 23 stands by for a certain period of time for receiving the cell state change completion notification. The certain period of time may be set based on the required time (Transition Time) included in the Transition Indicator. If the cell state change completion notification has been received from the ES cell 21 or the C cell 22 during the certain period of time (step S1204; YES), in step S1205, the neighbor cell 23 restarts (activates) the MRO with the ES cell 21 and/or the C cell 22.

If the cell state change completion notification has not been received from the ES cell 21 or the C cell 22 during the certain period of time (step S1204; NO), in step S1206, the neighbor cell 23 transmits a Transition Indicator including the unreceived information (Un receive Indicator) indicating that the cell state change completion notification has not been received, to a transmission source cell of the Transition Indicator received in step S1201.

Figure 11:
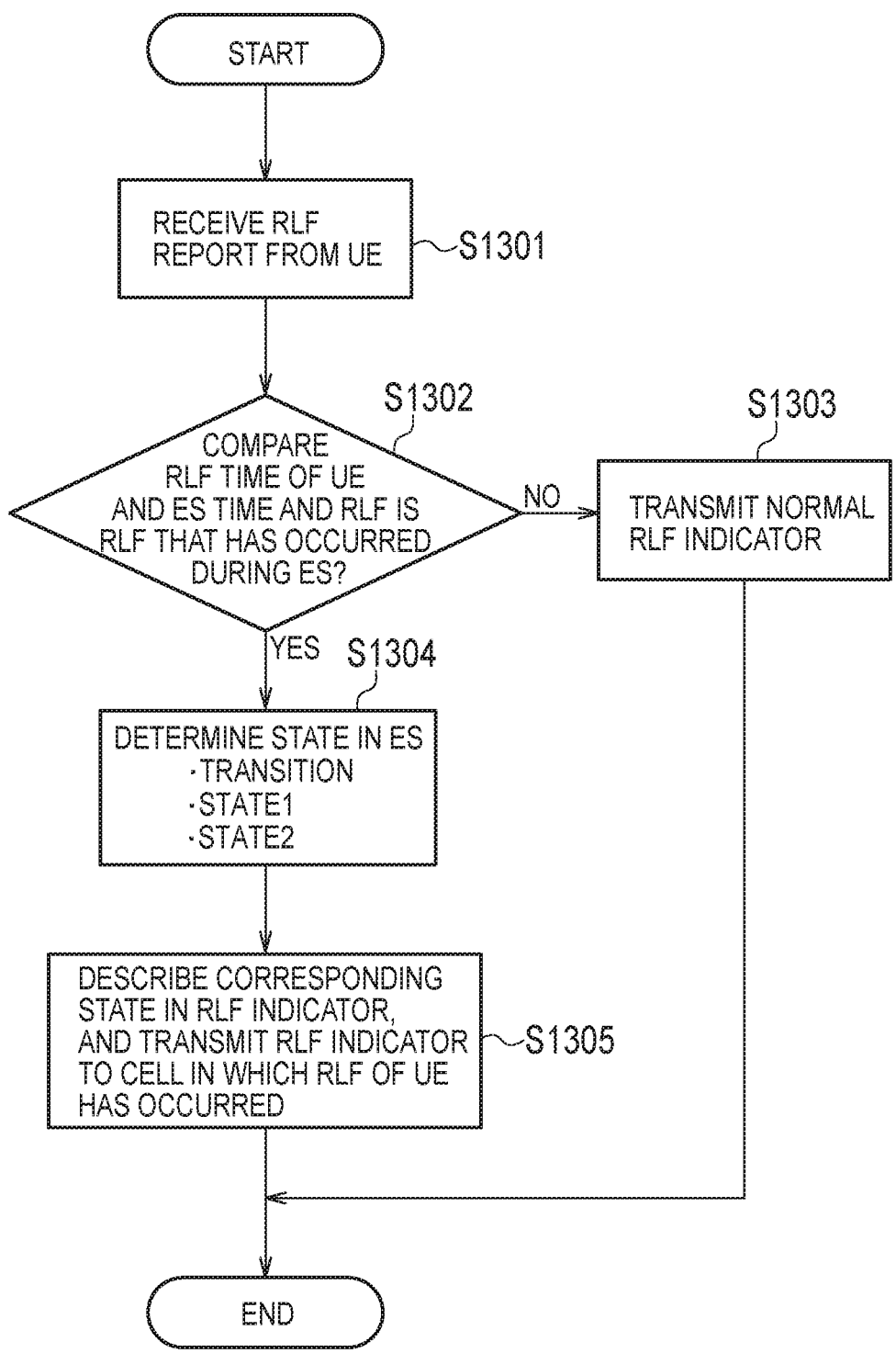
FIG. 11 is a flowchart illustrating an operation performed when an RLF report is received according to the first embodiment.

FIG. 11 is a flowchart illustrating an operation performed when the neighbor cell 23 has received an RLF report from the UE 100. If the UE 100 detects an RLF in the ES cell 21 during ES transition, and transitions to the RRC idle state without transmitting an RLF report, a time lag between the RLF occurrence to reporting becomes longer. In addition, the RLF that has occurred during the ES transition needs to be treated differently from an RLF that has occurred in the normal time. This is because inappropriate adjustment is performed if a mobility-related parameter for the normal time is adjusted based on the RLF that has occurred during the ES transition.

As illustrated in FIG. 11, in step S1301, the neighbor cell 23 receives an RLF report from the UE 100 connected to the own cell. Here, the RLF report is assumed to be related to an RLF that has occurred in the ES cell 21, and to include a cell identifier of the ES cell 21.

In step S1302, the neighbor cell 23 identifies, based on the cell identifier included in the received RLF report, that the RLF is an RLF to be notified to the ES cell 21. In addition, the neighbor cell 23 identifies an occurrence time of the RLF based on a time stamp included in the received RLF report. Then, based on the Transition Indicator received in the past, the neighbor cell 23 determines whether the occurrence time of the RLF is close to the period of ES transition. If the occurrence time of the RLF is not close to the period of ES transition (step S1302; NO), in step S1303, the neighbor cell 23 transmits a normal RLF notification (RLF Indicator) to the ES cell 21.

In contrast, if the occurrence time of the RLF is close to the period of ES transition (step S1302; YES), in step S1304, the neighbor cell 23 determines to which state of a state before ES transition (State1), a state in which ES transition is being performed (Transition), and a state after ES transition (State2) the occurrence time of the RLF corresponds.

In step S1305, the neighbor cell 23 includes information indicating the state corresponding to the occurrence time of the RLF (State1, Transition, or State2), in an RLF notification, and transmits the RLF notification to the ES cell 21. The information corresponds to information related to whether the RLF has occurred within the period of ES transition (cell expansion operation).

In addition, the application of this flow is not limited to the case in which the neighbor cell 23 has received the RLF report from the UE 100. This flow is similarly applicable to a case in which the C cell 22 has received an RLF report from the UE 100. In addition, this flow is similarly applicable to an RLF that has occurred in the C cell 22, in addition to an RLF that has occurred in the ES cell 21.

(Handover Control)

Figure 12:
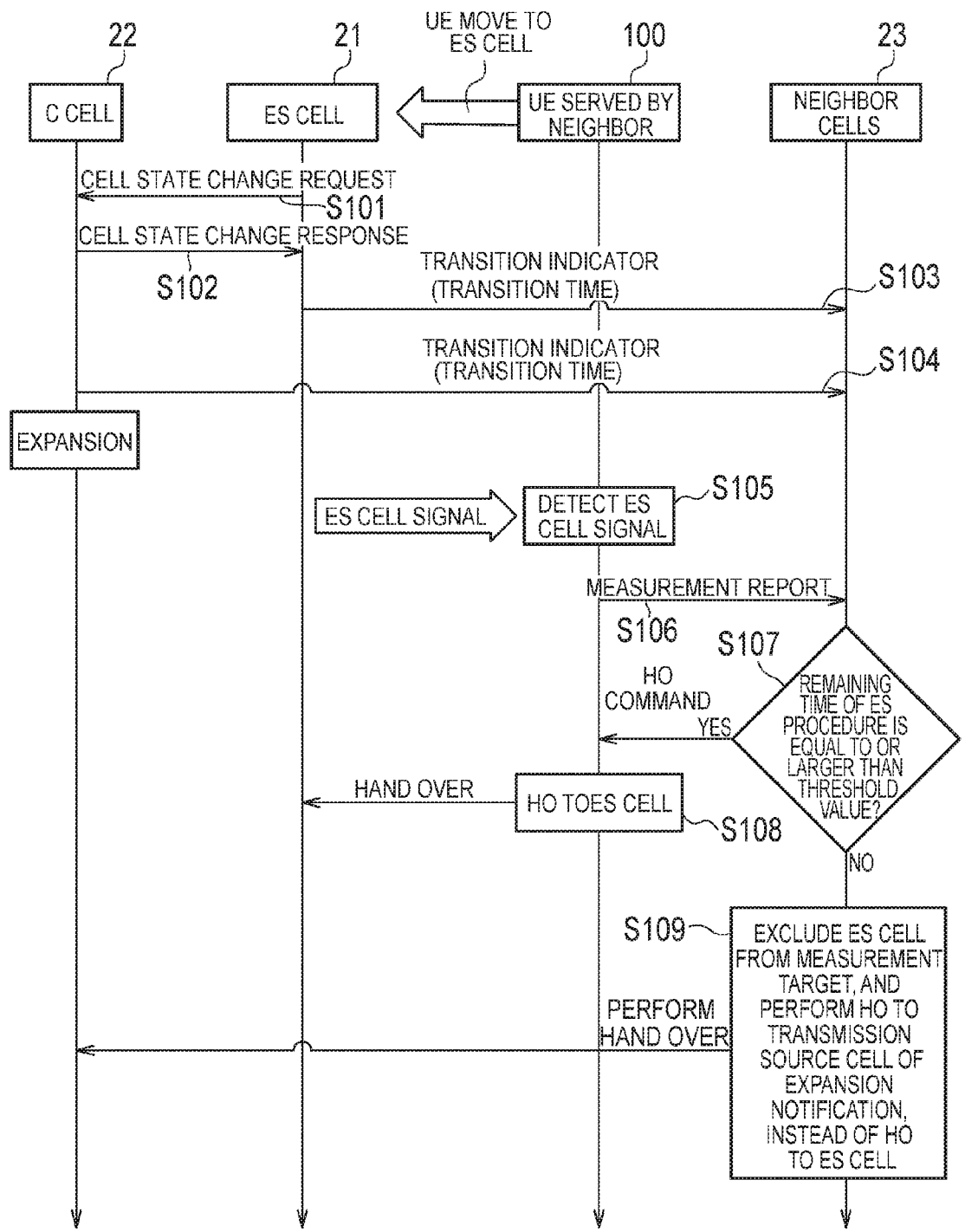
FIG. 12 is a flowchart illustrating handover control according to the first embodiment.

FIG. 12 is a flowchart illustrating handover control in the neighbor cell 23. During the ES transition, the neighbor cell 23 suppresses the handover of the UE 100 from the own cell to the ES cell 21 according to a remaining time until ES transition completion.

As illustrated in FIG. 12, operations from steps S101 to S104 are similar to those in FIG. 8. Transition Indicators (steps S103 and S104) include required time information (Transition Time). After steps S101 to S104, ES transition is started.

In step S105, the UE 100 connected to the neighbor cell 23 detects a reference signal transmitted by the ES cell 21, and measures the reception level of the reference signal.

In step S106, the UE 100 transmits a measurement report (Measurement report) including a measurement result for the ES cell 21, to the neighbor cell 23.

In step S107, the neighbor cell 23 that has received the measurement report recognizes, based on the received measurement report, that a handover candidate of the UE 100 is the ES cell 21. Then, based on the required time information (Transition Time), the neighbor cell 23 determines whether a remaining time until the ES cell 21 completes coverage reduction (ES transition) is equal to or larger than a threshold value.

If the remaining time until the ES cell 21 completes coverage reduction (ES transition) is equal to or larger than the threshold value (step S107; YES), the neighbor cell 23 starts a handover procedure of the UE 100 to the ES cell 21. In the handover procedure, the neighbor cell 23 transmits a handover command (HO command) for instructing handover, to the UE 100. In response to receiving the handover command, the UE 100 performs handover from the neighbor cell 23 to the ES cell 21.

In contrast, if the remaining time until the ES cell 21 completes coverage reduction (ES transition) is less than the threshold value (step S107; NO), in step S109, the neighbor cell 23 performs a handover procedure in such a manner as to perform handover of the UE 100 to the C cell 22, instead of handover of the UE 100 to the ES cell 21. In other words, if the remaining time until the ES transition is completed is short, handover to the C cell 22 is forcibly performed on the assumption that the coverage of the ES cell 21 is compensated for by the C cell 22. In addition, the neighbor cell 23 controls the UE 100 connected to the own cell, to exclude the ES cell 21 from a measurement target. Specifically, the neighbor cell 23 transmits, to the UE 100 connected to the own cell, information for excluding the ES cell 21 from a measurement target.

Modified Example of First Embodiment

Figure 13:
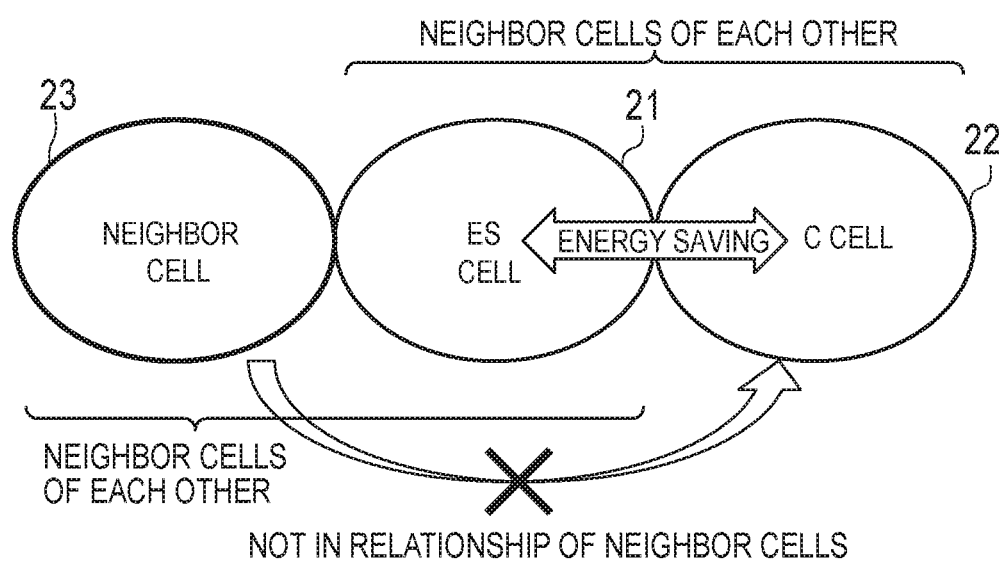
FIG. 13 is a diagram for illustrating a modified example of the first embodiment.

FIG. 13 is a diagram for illustrating a modified example of the first embodiment.

As illustrated in FIG. 13, the ES cell 21 transmits a coverage expansion notification (Transition Indicator) to a cell 23, which is a neighbor cell of the ES cell 21, and not a neighbor cell of the C cell 22, on behalf of the C cell 22. The cell 23 can thereby recognize the C cell 22 that is performing ES transition. Thus, the above-described handover control can be appropriately performed.

In addition, the C cell 22 transmits a coverage reduction notification (Transition Indicator) to a cell, which is a neighbor cell of the C cell 22, and not a neighbor cell of the ES cell 21, on behalf of the ES cell 21. The cell can thereby recognize the ES cell 21 that is performing ES transition. Thus, the above-described handover control can be appropriately performed.

Second Embodiment

A second embodiment will be described below mainly based on a difference from the first embodiment. A system configuration, an operation environment, and the like according to the second embodiment are similar to those according to the first embodiment.

(Operation Overview)

In the second embodiment, the ES cell 21 determines a coverage reduction speed of the ES cell 21 based on the number of connected UEs indicating the number of UEs 100 connected to the ES cell 21. In addition, the ES cell 21 transmits, to the C cell 22, speed information indicating the determined coverage reduction speed. The ES cell 21 may transmit the speed information to the C cell 22 using the above-described Transition Indicator.

Figure 14:
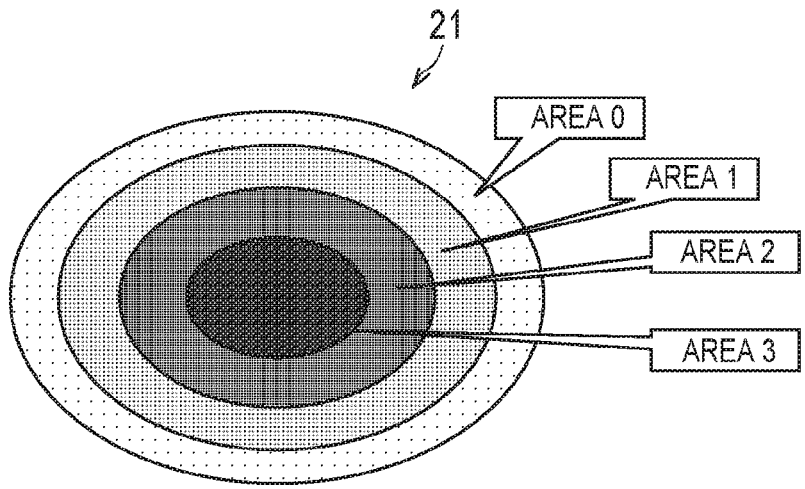
FIG. 14 is a diagram (1) for illustrating an operation overview according to the second embodiment.
Figure 15:
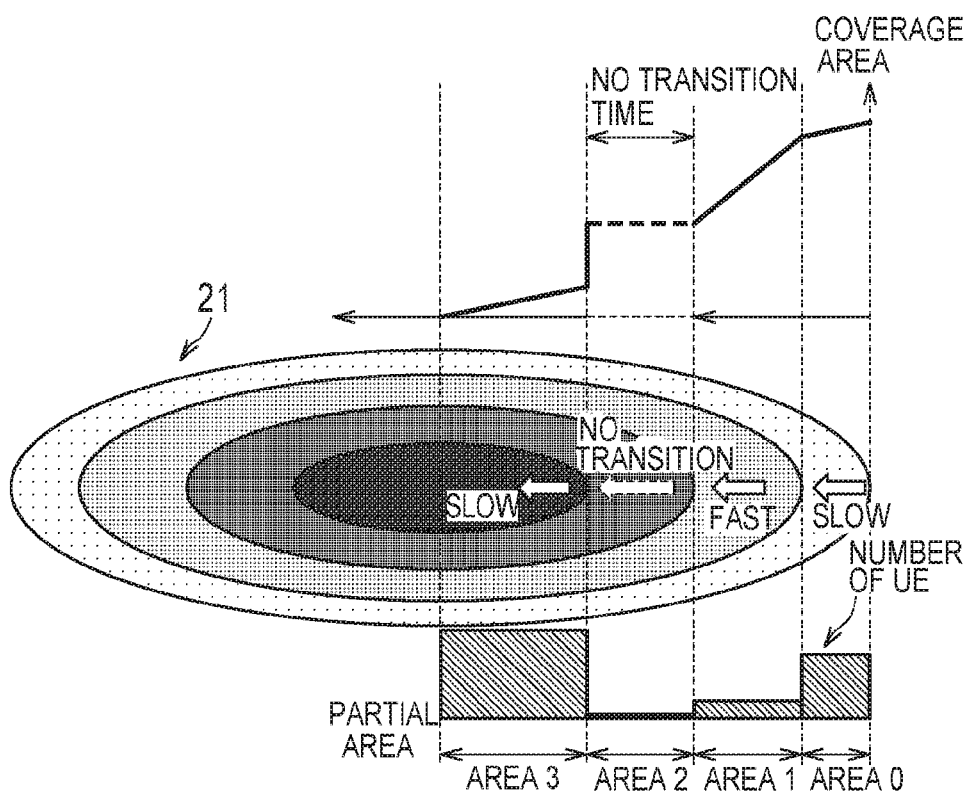
FIG. 15 is a diagram (2) for illustrating an operation overview according to the second embodiment.

FIGS. 14 and 15 are diagrams for illustrating an operation overview according to the second embodiment.

As illustrated in FIGS. 14 and 15, the coverage of the ES cell 21 is divided into a plurality of areas 0 to 3 having different distance zones from a coverage center. In this example, the areas 0 to 3 are set to be concentric circles. Nevertheless, the shapes of the areas 0 to 3 are not limited to such concentric circles, and may be other shapes (in a matrix, etc.). The following description will be given of an example case in which an actual distance from the coverage center is estimated to be used for control. Alternatively, a logical distance represented by an electrical parameter (e.g., path-loss value) may be used for control. For example, by directly using a path-loss value, processing load can be reduced as compared with a case of converting a path-loss value into an actual distance.

The ES cell 21 obtains the number of connected UEs of each of the plurality of areas. Specifically, the ES cell 21 estimates a distance from the coverage center for each of the UEs 100 connected to the own cell. For example, the distance is estimated based on at least one of an adjusted value of an uplink transmission timing (Timing Advance), transmission and reception power of an uplink signal (UL signal), and a headroom value of uplink transmission power (power headroom value).

Then, the ES cell 21 determines, for each target area in the plurality of areas 0 to 3, a coverage reduction speed of the target area based on the number of connected UEs of the target area. In the example in FIGS. 14 and 15, the area 0 has a large number of connected UEs, the area 1 has a small number of connected UEs, the area 2 does not have the number of connected UEs, and the area 3 has a larger number of connected UEs. In this case, the ES cell 21 determines, as coverage reduction speeds, low speed for the area 0, high speed for the area 1, no transition for the area 2, and low speed for the area 3.

In this manner, by setting higher coverage reduction speeds for areas with smaller numbers of connected UEs, the time required for ES transition can be shortened. In addition, by setting lower coverage reduction speeds for areas with larger numbers of connected UEs, a time required for the handover of the UEs 100 within the areas to the C cell 22 can be ensured. Furthermore, processing load (processor load of the eNB 200) and backhaul traffic load can be thereby temporally dispersed.

(Operation of ES Cell)

Figure 16:
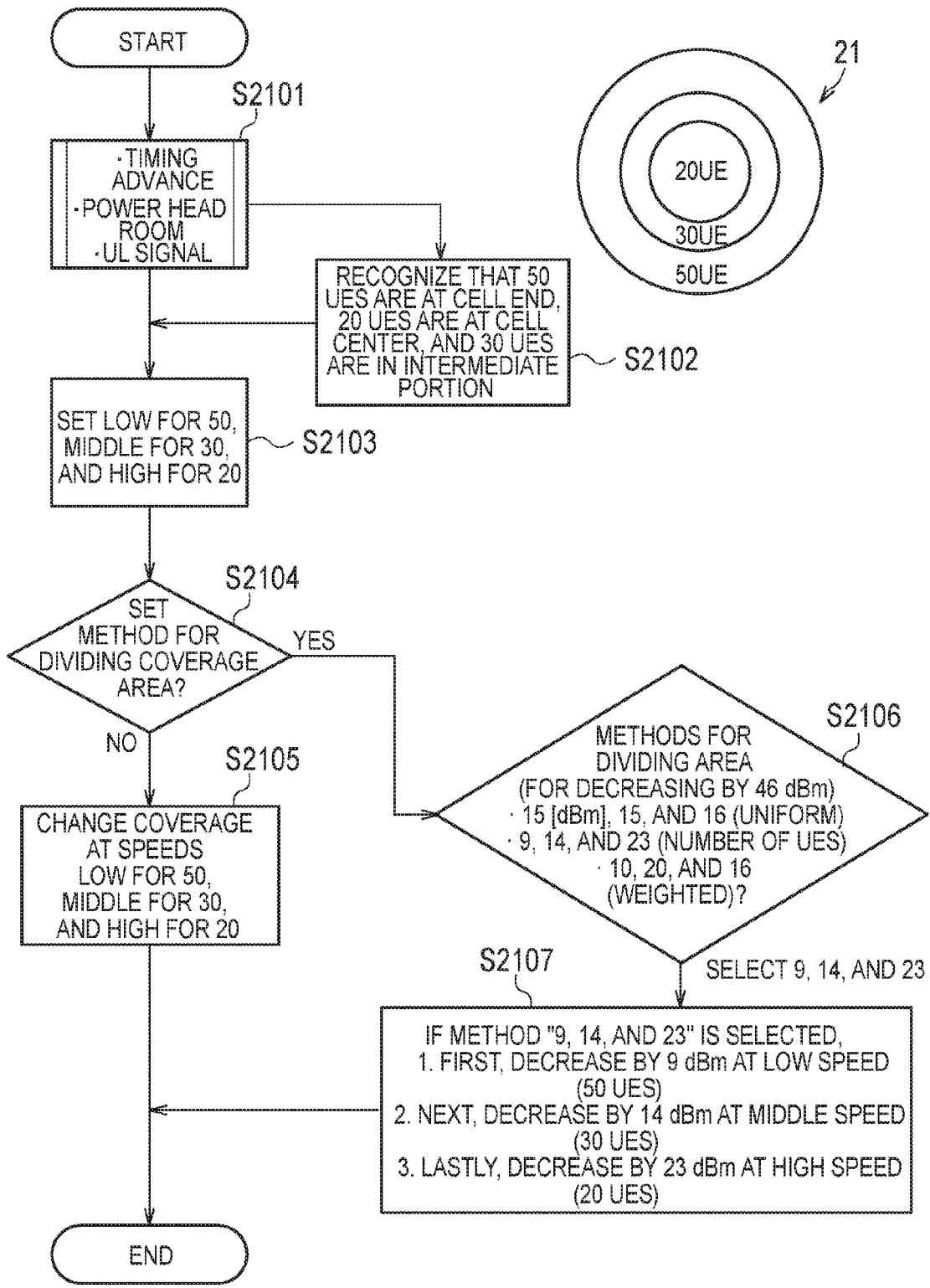
FIG. 16 is a flowchart illustrating an operation of an ES cell according to the second embodiment.

FIG. 16 is a flowchart illustrating an operation of the ES cell 21 according to the second embodiment.

As illustrated in FIG. 16, in step S2101, the ES cell 21 estimates, for each of UEs 100 connected to the own cell, a distance from the coverage center based on at least one of an adjusted value of an uplink transmission timing (Timing Advance), transmission and reception power of an uplink signal (UL signal), and a headroom value of uplink transmission power (power headroom value).

In step S2102, the ES cell 21 determines which of a plurality of areas within the coverage each of UEs 100 connected to the own cell belongs to. In this example, it is determined that 50 UEs are located at a cell end, 20 UEs are located in the vicinity of the coverage center, and 30 UEs are located in an intermediate portion therebetween.

In step S2103, the ES cell 21 determines, as coverage reduction speeds, low speed for the cell end (50 UEs), middle speed for the intermediate portion (30 UEs), and high speed for the coverage center vicinity (20 UEs). For example, as illustrated in Table 2, 3 s is set for each change of 10 dB (corresponding to coverage reduction of 1 Km) in the case of high speed (High), 5 s is set for each change of 10 dB (corresponding to coverage reduction of 1 Km) in the case of middle speed (Middle), and 7 s is set for each change of 10 dB (corresponding to coverage reduction of 1 Km) in the case of low speed (Low).

TABLE 2

| Speed Indicator | High | Middle | Low |
|---|---|---|---|
| Area[dB][Km] | [10][1] | [10][1] | [10][1] |
| Time[s] | [3] | [5] | [7]] |

If a method for dividing the area within the coverage is not changed (step S2104; NO), the ES cell 21 performs coverage reduction at a speed determined for each area (cell end, intermediate portion, and coverage center vicinity) (step S2105). In contrast, if a method for dividing the area within the coverage is changed (step S2104; YES), a method for dividing the area is reset, and then coverage reduction is performed (steps S2106 and S2107).

Figure 17:
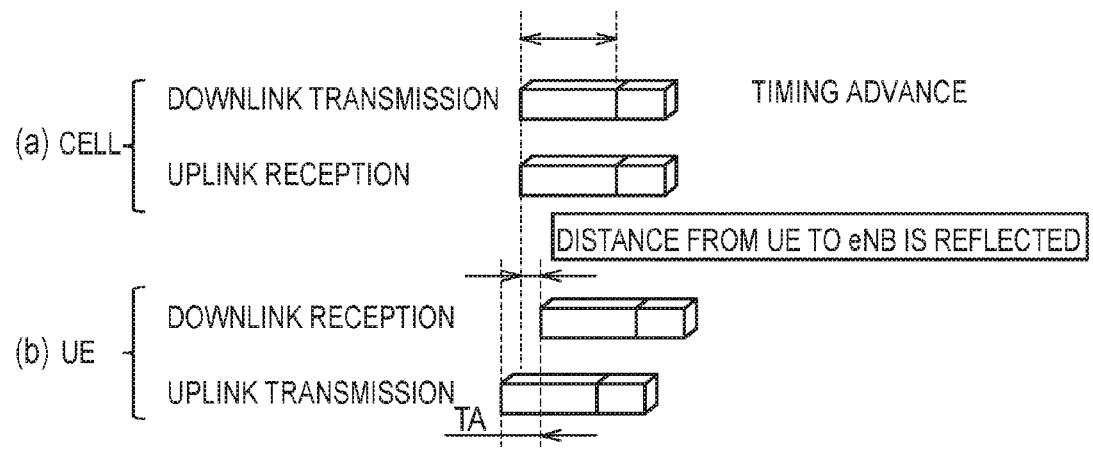
FIG. 17 is a diagram for illustrating the details of step S2101 in FIG. 16, and is a diagram illustrating a case of using an adjusted value of an uplink transmission timing.

FIGS. 17 to 19 are diagrams for illustrating the details of step S2101. FIG. 17 illustrates a case of using an adjusted value of an uplink transmission timing, FIG. 18 illustrates a case of using transmission and reception power of an uplink signal, and FIG. 19 illustrates a case of using a headroom value of uplink transmission power.

As illustrated in FIG. 17, the ES cell 21 performs control of adjusting a transmission timing of each UE 100, for compensating for a propagation delay of a radio signal. An adjusted value of an uplink transmission timing (Timing Advance) is an adjusted value that is based on a timing of a downlink signal. By setting the Timing Advance in the UE 100, the ES cell 21 enables an uplink signal from the UE 100 to be received at a desired timing. Here, the Timing Advance is set in such a manner as to advance a transmission timing for the UE 100 located more distant from the coverage center. In other words, a distance from the coverage center can be estimated based on the Timing Advance.

As illustrated in FIG. 18, in the uplink transmission power control of the UE 100, the ES cell 21 can recognize parameters for controlling the transmission power according to path-loss of the UE 100 (P0, $\alpha$, $\delta$TF, and f when a TPC command is also used). In addition, the ES cell 21 can measure the reception power of an uplink signal of the UE 100. Thus, (if $\alpha \neq 1$,) path-loss (propagation loss) can be obtained from a difference between the transmission power and the reception level of an uplink signal, and the path-loss is related to a distance between the ES cell 21 and the UE 100. In other words, a distance from the coverage center can be estimated based on the path-loss.

As illustrated in FIG. 19, the ES cell 21 receives a headroom value of uplink transmission power (power headroom value) from the UE 100. Here, since the ES cell 21 can recognize the maximum transmission power of the UE 100, the ES cell 21 can recognize the transmission power of the UE 100 based on the power headroom value. In addition, the ES cell 21 can also recognize a transmission power control parameter of the UE 100. The ES cell 21 can therefore obtain path-loss of an uplink, and estimate a distance from the coverage center based on the path-loss. Nevertheless, the maximum transmission power may be notified from the UE 100, considering the possibility that there is a UE 100 having the maximum transmission power different from that of a normal UE 100.

(Operation Sequence)

Figure 20:
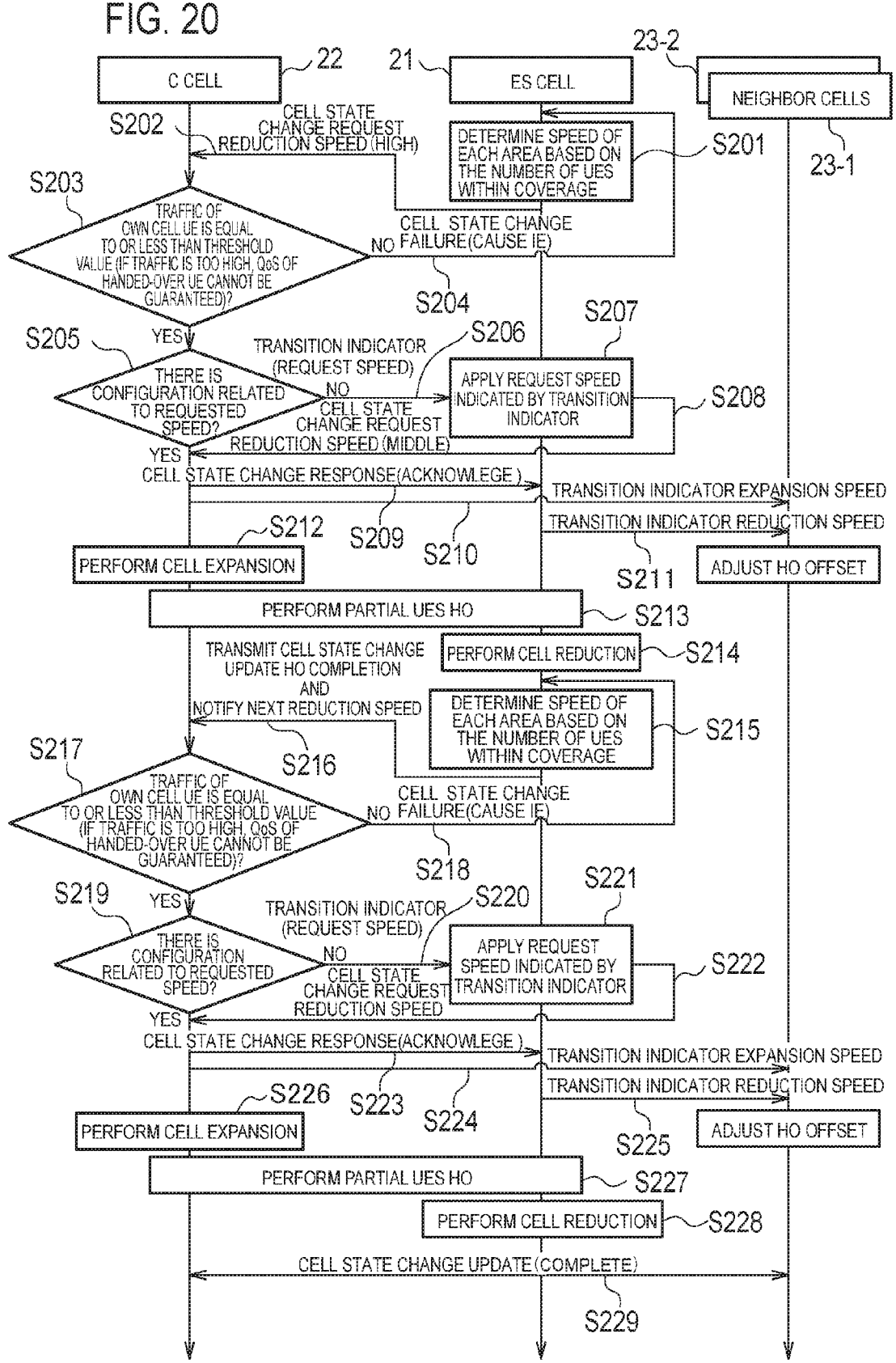
FIG. 20 is a sequence diagram illustrating an operation sequence according to the second embodiment.

FIG. 20 is a sequence diagram illustrating an operation sequence according to the second embodiment.

As illustrated in FIG. 20, the ES cell 21 determines a coverage reduction speed of the outermost area among a plurality of areas within the coverage (step S201), and transmits a cell state change request including information about the determined speed (e.g., High), to the C cell 22 (step S202).

The C cell 22 determines whether a traffic amount of the own cell is equal to or less than a threshold value, and if the traffic amount of the own cell exceeds the threshold value (step S203; NO), transmits a negative response indicating this, to the ES cell 21 (step S204).

If the traffic amount of the own cell is equal to or less than the threshold value (step S203; YES), the C cell 22 determines whether coverage expansion can be performed at the speed determined by the ES cell 21 (step S205). For example, if a setting (Configuration) of the speed determined by the ES cell 21 is not included, it is determined that the speed is not supported.

If coverage expansion cannot be performed at the speed determined by the ES cell 21 (step S205; NO), the C cell 22 notifies a speed supported by the own cell, to the ES cell 21 using a Transition Indicator (step S206), and the ES cell 21 retransmits a cell state change request including information about the notified speed (e.g., Middle), to the C cell 22 (steps S207 and S208).

The C cell 22 transmits a positive response to the cell state change request, to the ES cell 21 (step S209), and transmits a coverage expansion notification (Transition Indicator) to the neighbor cell 23 (step S210). In addition, the ES cell 21 transmits a coverage reduction notification (Transition Indicator) to the neighbor cell 23 (step S211).

The C cell 22 starts coverage expansion at the set speed (step S212). While handing over the UE 100 to the C cell 22 (step S213), the ES cell 21 starts coverage reduction at the set speed (step S214).

Then, the ES cell 21 determines a coverage reduction speed of the next area among the plurality of areas within the coverage (step S215), and transmits a cell state change update (Cell State Change Update) including information about the determined speed, to the C cell 22 (step S216).

The C cell 22 determines whether a traffic amount of the own cell is equal to or less than a threshold value, and if the traffic amount of the own cell exceeds the threshold value (step S217; NO), transmits a negative response indicating this, to the ES cell 21 (step S218).

If the traffic amount of the own cell is equal to or less than the threshold value (step S217; YES), the C cell 22 determines whether coverage expansion can be performed at the speed determined by the ES cell 21 (step S219).

If coverage expansion cannot be performed at the speed determined by the ES cell 21 (step S219; NO), the C cell 22 notifies a speed supported by the own cell, to the ES cell 21 using a Transition Indicator (step S220), and the ES cell 21 retransmits a cell state change request including information about the notified speed, to the C cell 22 (steps S221 and S222).

The C cell 22 transmits a positive response to the cell state change request, to the ES cell 21 (step S223), and transmits a coverage expansion notification (Transition Indicator) to the neighbor cell 23 (step S224). In addition, the ES cell 21 transmits a coverage reduction notification (Transition Indicator) to the neighbor cell 23 (step S225).

The C cell 22 starts coverage expansion at the set speed (step S226). While handing over the UE 100 to the C cell 22 (step S227), the ES cell 21 starts coverage reduction at the set speed (step S228).

Then, if ES transition is completed, the ES cell 21 transmits a completion notification indicating this (Cell State Change Update) to the C cell 22 and the neighbor cell 23 (step S229).

Third Embodiment

The third embodiment will be described below mainly based on a difference from the first and second embodiments.

In the third embodiment, in the case of stopping coverage reduction of the own cell, the ES cell 21 transmits a coverage reduction stop notification (Transition indicator (Transition Stop)) to neighbor cells including the C cell 22. The coverage reduction stop notification may include information indicating a period for which coverage reduction of the ES cell 21 is to be stopped. Even if the stop period is not included in the first Transition Indicator, a Transition Indicator including information indicating the stop period is retransmitted as soon as the ES cell 21 can recognize the stop period. In addition, the coverage reduction stop notification includes information indicating the transmission power of the ES cell 21 that is set when the coverage reduction of the ES cell 21 is stopped. Furthermore, in the case of restarting coverage reduction of the own cell, the ES cell 21 transmits a coverage reduction restart notification (Transition Indicator (Transition Restart)) to neighbor cells including the C cell 22.

With this configuration, even if the ES cell 21 stops ES transition, the C cell 22 and the neighbor cells 23 can recognize the ES transition stop status.

In addition, in the case of stopping coverage expansion of the own cell, the C cell 22 transmits a coverage expansion stop notification (Transition indicator (Transition Stop)) to neighbor cells including the ES cell 21. The coverage expansion stop notification may include information indicating a period for which coverage expansion of the C cell 22 is to be stopped. Even if the stop period is not included in the first Transition Indicator, a Transition Indicator including information indicating the stop period is retransmitted as soon as the C cell 22 can recognize the stop period. In addition, the coverage expansion stop notification includes information indicating the transmission power of the C cell 22 that is set when the coverage expansion of the C cell 22 is stopped. In the case of restarting coverage expansion of the own cell, the C cell 22 transmits a coverage expansion restart notification (Transition indicator (Transition Restart)) to neighbor cells including the ES cell 21.

FIG. 21 is a sequence diagram illustrating an operation sequence according to the third embodiment.

As illustrated in FIG. 21, operations from steps S301 to S304 are similar to those in FIG. 8. After steps S301 to S304, ES transition is started, and the MRO is cancelled (step S305). In addition, the C cell 22 starts coverage expansion (step S306), and the ES cell 21 starts coverage reduction (step S307).

Here, suppose that a traffic amount of the ES cell 21 increases, and it is detected that coverage reduction becomes difficult to be continued (step S308). In this case, the ES cell 21 stops coverage reduction (step S309), and transmits a coverage reduction stop notification (Transition indicator (Transition Stop)) to the C cell 22 and the neighbor cells 23. This causes a state in which ES transition is stopped.

In the state in which ES transition is stopped, the ES cell 21, the C cell 22, and the neighbor cells 23 may restart the MRO (step S311). For example, a mobility-related parameter corresponding to information about transmission power that is included in the coverage reduction stop notification is acquired, and the mobility-related parameter is optimized.

Then, if a traffic amount of the ES cell 21 decreases (step S312), the ES cell 21 transmits a coverage reduction restart notification (Transition indicator (Transition Restart)) to the C cell 22 and the neighbor cells 23 (step S313), and restarts coverage reduction (step S315). If the ES transition is restarted in this manner, the ES cell 21, the C cell 22, and the neighbor cells 23 cancel the MRO again (step S314). Operations performed thereafter (steps S317 to S324) are similar to those in the second embodiment.

Other Embodiments

In the above-described embodiments, the description has been given of the example case in which the ES cell 21 and the C cell 22 belong to different eNBs 200. Nevertheless, the present disclosure is also applicable to a case in which the ES cell 21 and the C cell 22 belong to the same eNB 200.

In addition, in the above-described embodiments, an LTE system has been described as an example of a mobile communication system. The mobile communication system, however, is not limited to the LTE system. The present disclosure may be applied to a system other than the LTE system.

CROSS-REFERENCE

Japanese Patent Application No. 2014-017979 (filed Jan. 31, 2014) is incorporated by reference herein in its entirety.

The invention claimed is:

1. A system comprising:
a first base station configured to manage a first cell; and
a second base station configured to be connected with the first base station via an X2 interface, wherein
the first base station is configured to execute processes of
  transmitting a message, which includes a first identifier, a change notification, coverage state information, and a second identifier, to the second base station before modifying a coverage of the first cell, the first identifier identifying the first cell, the change notification indicating that the first base station is planned to modify the coverage of the first cell, the coverage state information indicating a state of the coverage of the first cell after modification of the coverage, the second identifier identifying a second cell for compensating at least part of the coverage of the first cell, and
  modifying the coverage of the first cell after transmitting the message, the second base station is configured to execute processes of
receiving the message,
determining that the first base station modifies the coverage of the first cell, based on the first identifier, the change notification, and the coverage state information.

2. The system according to claim 1, wherein
the second base station is further configured to execute a process of determining, based on the second identifier, the second cell as an alternative handover target for the first cell.

3. The system according to claim 1, wherein
the second base station is further configured to execute a process of avoiding triggering handovers towards the first cell, in response to the first cell being indicated to be inactive by the coverage state information.

4. The system according to claim 1, wherein
the second base station is further configured to execute a process of controlling, based on the coverage state information, a mobility robustness optimization (MRO) function for automatically changing mobility related parameters.

5. The system according to claim 1, wherein
the modifying comprises modifying the coverage while the first cell remains in an active state.

6. A first base station configured to be connected with a second base station via an X2 interface, comprising:
a controller containing at least one processor and at least one memory, and configured to execute processes of
transmitting a message, which includes a first identifier, a change notification, coverage state information, and a second identifier, to the second base station before modifying a coverage of the first cell, the first identifier identifying the first cell, the change notification indicating that the first base station is planned to modify the coverage of the first cell, the coverage state information indicating that a state of the coverage after modification of the coverage, the second identifier identifying a second cell for compensating at least part of the coverage of the first cell, and
modifying the coverage of the first cell after transmitting the message.

7. A second base station configured to be connected with a first base station via an X2 interface, comprising:
a controller containing at least one processor and at least one memory, and configured to execute processes of
receiving a message, which includes a first identifier, a change notification, coverage state information, and a second identifier from the first base station before a coverage of the first cell is modified, the first identifier identifying the first cell, the coverage state information indicating a state of the coverage of the first cell after modification of the coverage, the second identifier identifying a second cell for compensating at least part of the coverage of the first cell, and
determining that the first base station modifies the coverage of the first cell, based on the first identifier, the change notification, and the coverage state information.

8. A processor for controlling a first base station configured to be connected with a second base station via an X2 interface, configured to:
transmit a message, which includes a first identifier, a change notification, coverage state information, and a second identifier, to the second base station before modifying a coverage of the first cell, the first identifier identifying the first cell, the change notification indicating that the first base station is planned to modify the coverage of the first cell, the coverage state information indicating that a state of the coverage after modification of the coverage, the second identifier identifying a second cell for compensating at least part of the coverage of the first cell, and
modify the coverage of the first cell after transmitting the message.

* * * * *